United States Patent [19]

Evangelisti et al.

[11] Patent Number: 5,392,385
[45] Date of Patent: Feb. 21, 1995

[54] PARALLEL RENDERING OF SMOOTHLY SHAPED COLOR TRIANGLES WITH ANTI-ALIASED EDGES FOR A THREE DIMENSIONAL COLOR DISPLAY

[75] Inventors: Carlo J. Evangelisti, Jefferson Valley, N.Y.; Leon Lumelsky, Stamford, Conn.; Mark J. Pavicic, Fargo, N. Dak.

[73] Assignee: International Business Machines Corporation, Armonk, N.Y.

[21] Appl. No.: 888,385

[22] Filed: May 22, 1992

Related U.S. Application Data

[63] Continuation of Ser. No. 130,930, Dec. 10, 1987.

[51] Int. Cl.$^6$ ............................................. G06F 15/62
[52] U.S. Cl. ................................... 395/131; 395/141; 395/163
[58] Field of Search ................ 364/518, 521; 340/798, 340/799, 728, 703, 729, 700; 395/163, 141, 129, 131, 132

[56] References Cited

U.S. PATENT DOCUMENTS

| | | | |
|---|---|---|---|
| 3,602,702 | 8/1971 | Warnock | 235/151 |
| 3,665,408 | 5/1972 | Erdahl et al. | 340/172.5 |
| 4,156,237 | 5/1979 | Okada et al. | 340/701 |
| 4,208,719 | 6/1980 | Lotz et al. | 364/515 |
| 4,343,037 | 8/1982 | Holton | 364/521 |
| 4,631,690 | 12/1986 | Corthout et al. | 395/163 X |
| 4,860,248 | 8/1989 | Lumelsky | 395/163 |
| 4,873,515 | 10/1989 | Dickson et al. | 395/163 X |
| 4,918,625 | 4/1990 | Yan | 395/131 |

OTHER PUBLICATIONS

Michael J. Flynn, "Very High-Speed Computing Systems", 1986 Proceedings of the IEEE, vol. 54, No. 12, Dec. 1966, pp. 1901 to 1909.

M. E. Newell, R. G. Newell and T. L. Sancha, "A Solution to the Hidden Surface Problem", 1972, Annual Conference of The Proceedings of the ACM, pp. 443 to 450.

Fuchs et al., "Developing Pixel Planes, A Smart Memory Based Roster Graphics System," 1982 Conference on Advanced Research in VLSI, M.I.T., Jan. 27, 1982, pp. 137-146.

Clark et al., "Distributed Processing in a High Performance Smart Image Memory," Lambda, 4th Quarter, pp. 40-45.

Gourand, "Continuous Shading of Curved Surfaces," IEEE Transactions on Computers, vol. C-20, No. 6, Jun. 1971, pp. 623-629.

Book "Computer Image Generation" edited by B. J. Schachter, published by J. Wiley & Sons, N.Y, (1983), pp. 28-31 and 125-135.

*Primary Examiner*—Mark K. Zimmerman
*Attorney, Agent, or Firm*—Louis J. Percello

[57] ABSTRACT

SIMD computer architecture is used in conjunction with a host processor and coordinate processor to render quality, three-dimensional, anti-aliased shaded color images into the frame buffer of a video display system. The method includes a parallel algorithm for rendering an important graphic primitive for accomplishing the production of a smoothly shaded color three-dimensional triangle with anti-aliased edges. By taking advantage of the SIMD architecture and said parallel algorithm, the very time consuming pixel by pixel computations are broken down for parallel execution. A single coordinate processor computes and transmits an overall triangle record which is essentially the same for all blocks of pixels within a given bounding box which box in turn surrounds each triangle. The individual pixel data is produced by a group of M×N pixel processors and stored in the frame buffer in a series of repetitive steps wherein each step corresponds to the processing of an M×N block of pixels within the bounding box of the triangle. Thus, each pixel processor performs the same operation, modifying its computations in accordance with triangle data received from the coordinate processor and positional data unique to its own sequential connectivity to the frame buffer, thus allowing parallel access to the frame buffer.

9 Claims, 17 Drawing Sheets

FIG. 2
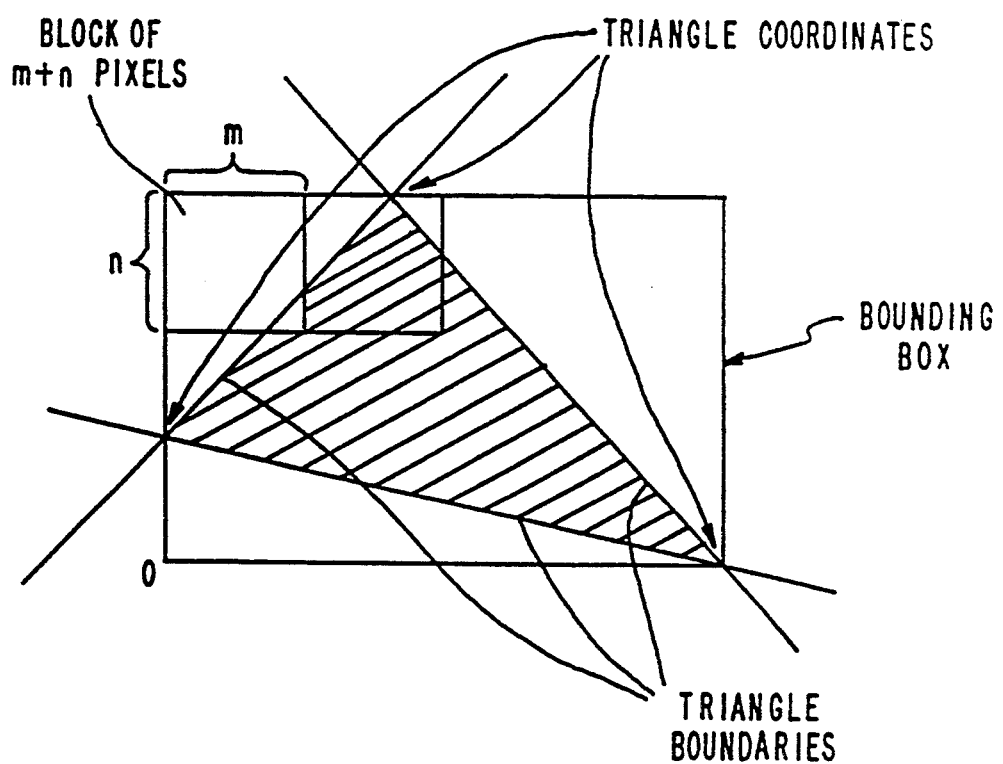
FIG. 3B
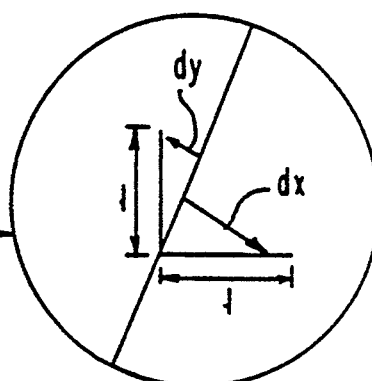
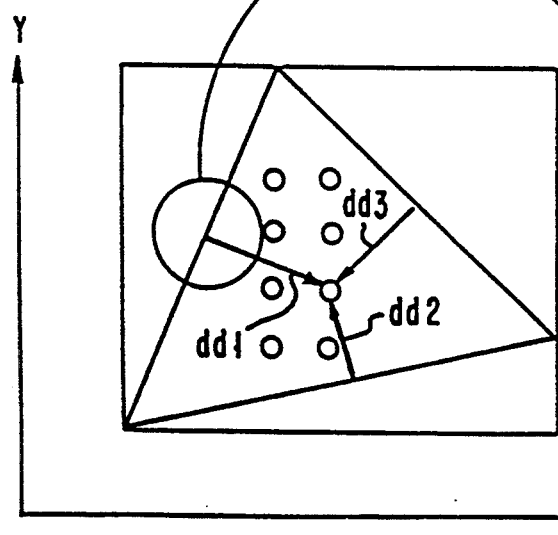
FIG. 3A

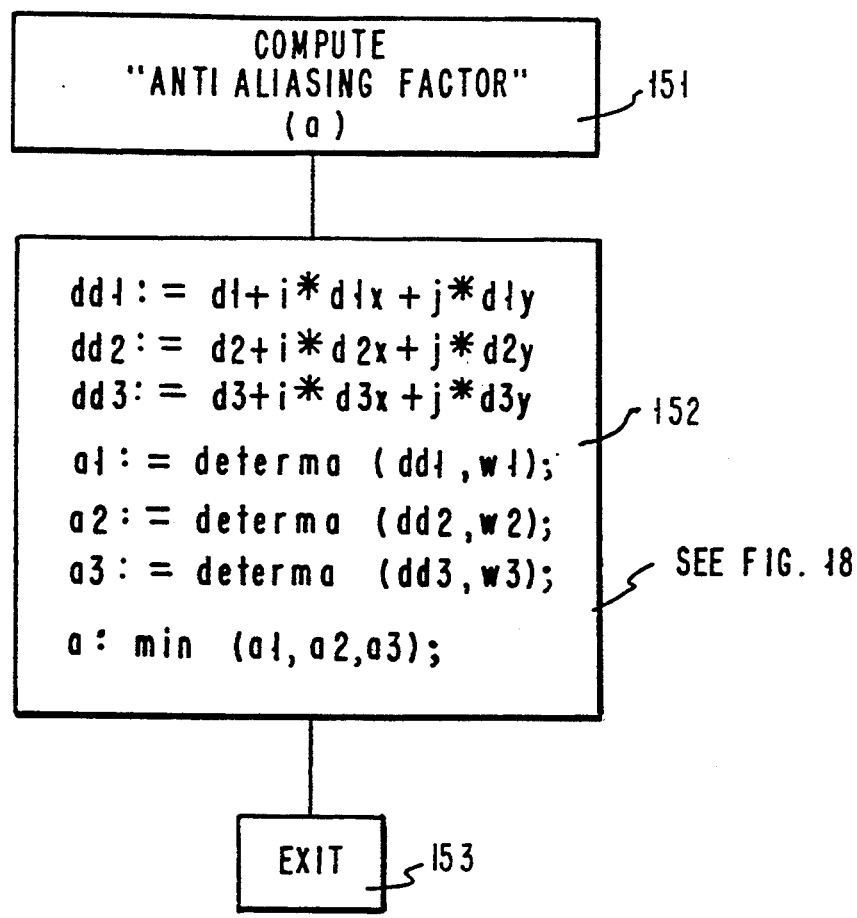
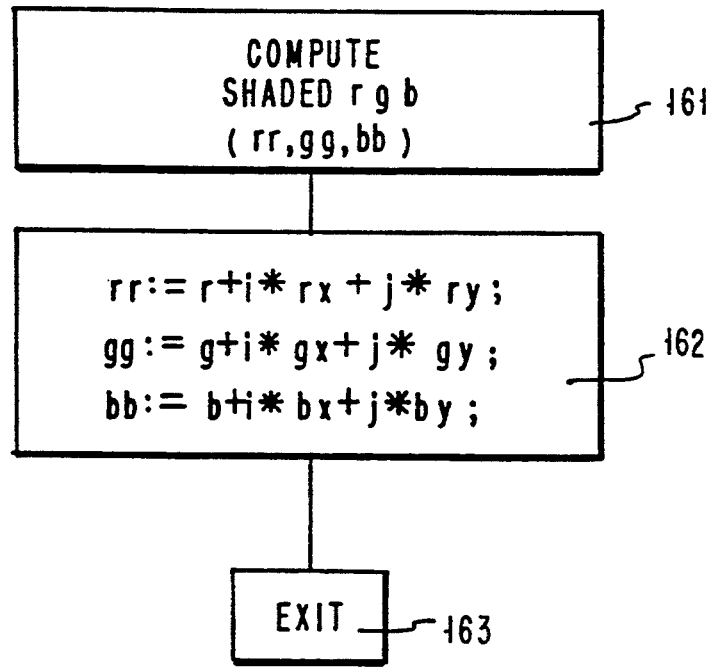

TRIANGLE RECORD FROM cp TO pp

| d1x | d1y | d2x | d2y | d3x | d3y | w1 | w2 | w3 |
|---|---|---|---|---|---|---|---|---|
| rx | ry | gx | gy | bx | by | | | |
| $d_1$ | $d_2$ | $d_3$ | r | g | b | | | |

PARALLEL RENDERING OF SMOOTHLY SHAPED COLOR TRIANGLES WITH ANTI-ALIASED EDGES FOR A THREE DIMENSIONAL COLOR DISPLAY

This application is a continuation of U.S. Ser. No. 07/130,930, filed Dec. 1987, by C. Evangelisti et al., entitled Parallel Rendering of Smoothly Shaded Color Triangles and Anti-Aliased Edges for a Three Dimensional Color Display, assigned to the same assignee as this patent application.

FIELD OF THE INVENTION

The present invention relates generally to the field of video displays. It relates more particularly to methods for making video data computations whereby a significantly improved display of three-dimensional color images projected upon a two-dimensional display screen is achieved. It relates still more particularly to such methods whereby shading and anti-aliased are achieved in a highly efficient and improved manner.

BACKGROUND OF THE INVENTION

A primary consideration in the field of video data processing applications is the time involved in executing operations on the extremely large quantities of data involved. As modern displays become ever more sophisticated, larger volumes of more complex data are involved. For example, typical low-end displays are becoming available having a dimension of 1000×1000 pixels or 1 million pixels values. More particularly in the field of color graphics, each pixel is represented by a significant plurality of bits (often 24 bit) representing red, green and blue intensity values which must be processed in complex video data processing applications. When a single host processor must handle all graphic computations, the result typically is an unacceptably long execution time. It is relatively well known in the computer art that where a given problem requires a great many computations that a certain amount of time can be saved by performing certain computations in parallel. In video data processing this can be done by employing a plurality of processors to simultaneously operate on different parts of the image. One solution is to have a plurality of simple processors with a processor for every pixel in the image. A special purpose control processor issues data and special instructions to each of the plurality of pixel processors. It has similarly been known to arrange such pixel processors variously in an array, or in a line wherein the whole raster scan image can be processed concurrently, a line at a time, or as subsets of the array, i.e., sub arrays.

Although such systems have been known in the prior art, they have not been widely used due to the system overhead of supplying data and commands to the plurality of pixel processors and subsequently storing the data produced in the frame buffers. Also, in such applications the frame buffers themselves become very complex. Accordingly only very simple pixel operations have been performed by such prior art multiprocessor systems as exemplified by the following publications.

i) Fuchs, H. Poulton, I., Paeth, A and Bell A., "Developing Pixel Planes, A Smart Memory Based Roster Graphics System," 1982 conferenced on Advanced Research in VLSI, at MIT, Jan 17, 1982 pp. 137–146.

ii) Clark, J. H., and Hannah, M. R. "Distributed Processing in a High Performance Smart Image Memory", Lambda, 4th Quarter 1980 pp. 40–45.

As indicated above, the types of operations which have heretofore been available with such processor per pixel video architectures have been extremely limited in nature and, more particularly, limited in the complexity of the operations performed. In the field of color graphics, due to the amount of data involved per pixel, the manipulative operations become quite complex and frequently require relatively involved computations as compared to black/white or grayscale operations. The types of applications that have been envisioned for color graphics are complex, and have been limited due to the large amount of time necessary to perform the operations on a pixel by pixel basis. Further, due to the complexity of the operations, it has never been considered feasible to perform such operations as shading of three-dimensional images and anti-aliasing on anything approaching a processor per pixel type of display architecture which might be constructed as an SIMD pixel processor architecture.

In video displays, when projecting a three-dimensional image onto a two-dimensional surface, the attaining of uniformly shaded areas in the polygons making up the image and anti-aliasing of the intersecting edges of these polygons to provide an enhanced image has always been a complex problem. The basic geometry for providing the shading and anti-aliasing has long been known as will be set forth more fully subsequently. However, providing such enhanced images via an SIMD architecture has never been considered feasible due to the complexity of the computations which must be performed. Hence, such image upgrading is conventionally done serially, pixel by pixel in a host or image processor.

In such color images, the triangle is the primitive shape for modeling three-dimensional surfaces. Although rectangles have also been used, triangles have the important advantage that they retain their planarity under perspective transformation. To render a three-dimensional surface, the triangles are projected onto a two-dimensional surface, the image plane. The triangles are drawn from back to front to remove hidden surfaces (by known algorithms). In order to provide optimized displays, it is desired that each triangle be smoothly shaded and have anti-aliased edges. This is well known. The smooth shading creates the effect of a continuous surface, and anti-aliasing of edges results in smooth rather than jagged boundaries which further contribute to the effect of continuity of the displayed image. Conventional serial systems have not been able to generate such images at acceptable speeds. The herein disclosed invention greatly improves this situation by exploiting parallelism in an economical SIMD pixel processing architecture realizing a novel program which is run identically on each processor and contains the requisite data modification constructs whereby each processor is capable of modifying its own particular pixel in an array of pixels to produce a smoothly shaded, anti-aliased, three-dimensional image on the display screen.

DESCRIPTION OF THE PRIOR ART

The following references are cumulative to the references disclosed and discussed in the following "Description of the Embodiment" section of the specifications and were found pursuant to a prior art search in the United States Patent and Trademark Office for the subject matter of the present invention. Their relevancy is explained below.

An article by H. Gourand entitled "Continuous Shading of Curved Surfaces", IEEE Transactions on Computers, Vol. 20, No. 6, June '71 pages 623–629 discloses well known methods of shading, but does not disclose nor suggest the present method of performing such operation in parallel with anti-aliasing on an SIMD architecture.

The book "Computer Image Generation" edited by B. J. Schachter, published by J. Wiley & Sons, N.Y. (1983) describes shading as performed by Gourand. The present invention performs linear interpolation but not for a point on a scanline. It is done for a point on a triangle with information about the triangle given to a parallel pixel processor architecture. The present invention performs a fast and simple method of calculating the smoothing to take advantage of parallel processing. Schachter describes the problem of anti-aliasing but does not disclose a method for removing the effects using the parallelism in an SIMD pixel processor architecture.

U.S. Pat. No. 3,602,702 of Warnock discloses a method for rendering 3D shaded polygons on a 2D surface with hidden surface elimination. The present invention comprises a novel method for calculating shading and anti-aliasing by providing parallel processors which use information provided once per triangle. The disclosed operations are performed on 2D triangles in which 3D information has been captured in rate data as will be described later.

U.S. Pat. No. 3,665,408 of Erdahl, et al describes a system for displaying bounded areas on a screen with an intensity function for that area. The present invention comprises a fast method for providing anti-aliasing for such an image after it has been rendered to 2D with rate data. The present method for smoothing is a simple calculation with small cost, performed contemporaneously with anti-aliasing is done.

U.S. Pat. No. 4,343,037 of Bolton shows a pipe-line processor to perform perspective transformation. In the present system, the 3D image has already been rendered as a 2D image in the frame buffer. Further, it provides parallel processing to anti-alias the edges in the frame buffer with smoothing done at small extra cost. This is not suggested in Bolton.

U. S. Pat. Nos. 4,156,237 of Okada et al, and 4,208,719 of Lotz et al, broadly disclose parallel or pipe-lined architectures for use with particular video displays but otherwise have little to do with an SIMD computer architecture organized to perform simultaneous shading and anti-aliasing operations on 3D color triangles projected onto a 2D color display.

SUMMARY AND OBJECTS OF THE INVENTION

It is a primary object of the present invention to provide a novel method for rapidly producing smoothly shaded color triangles with anti-aliased edges for use in a three-dimensional video display which utilizes the parallel execution capabilities of an SIMD parallel processing architecture.

It is another object of the invention to provide such a method wherein an identical parallel algorithm is utilized in each processor of the SIMD architecture but with unique data for each processor to produce necessary pixel modifications in the display.

It is a further object of the invention to provide such a method wherein all of the processors of the SIMD architecture are organized into an $M \times N$ array, each processor modifying a different pixel related to a physically associated $M \times N$ array in the frame buffer and/or the display screen thus allowing parallel update to the frame buffer.

It is yet another object of the invention to provide such a method wherein a single coordinate processor computes general image data concerning a portion of an image being processed and wherein the individual pixel processors utilize this data to produce the actual pixel image data which is stored in the frame buffer and displayed.

Other objects, features and advantages of the invention will be apparent from the following description of the herein disclosed preferred embodiment of the invention.

The objects of the present invention may be accomplished by an SIMD computer architecture utilized in conjunction with a host processor and coordinate processor to render quality, anti-aliased, shaded color images into the frame buffer of a video display system. The method includes a parallel algorithm for rendering an important graphic primitive for accomplishing the production of a smoothly shaded color three-dimensional triangle with anti-aliased edges for display on a two-dimensional display screen. By taking advantage of the SIMD architecture and said parallel algorithm, the very time-consuming computations are broken down for parallel execution. A single coordinate processor computes and transmits an overall bounding box record which is essentially the same for all blocks of pixels within a given bounding box which box in turn surrounds each triangle. The individual pixel data is produced by a group of $M \times N$ pixel processors and stored in the frame buffer in a series of steps wherein each step corresponds to the processing of an $M \times N$ block of pixels within the bounding box.

The method allows all of the processors to appear to be performing different functions while, in reality, they are all performing the same operation on a common instruction sequence. According to the method, a host processor provides the physical x,y,z data defining the location of each triangle in the frame buffer and on the display screen as well as its color. A coordinate processor computes for each triangle the instantaneous rate of change of the distance to any of the three sides of the triangle along both the x an y axis and the rate of change of intensity of each of the primary colors, red, blue and green, along both the x and y axes as a point moves across the triangle.

The coordinate processor also computes the coordinates of the origin of each of a plurality of $M \times N$ pixel constituent blocks which constitute a bounding box which bounding box completely encloses the triangle and wherein there are at least $M \times N$ separate processors in the SIMD processor system. When all of the required rate of change data is computed for each triangle, the system controls cause the $M \times N$ array of processors (pixel processors) to sequentially compute new values for each constituent block of related $M \times N$ pixels in the frame buffer properly modified for shading and anti-aliasing. This is accomplished by processing, in parallel, all of the pixels in a particular block and repeating the operations until all of the blocks constituting a bounding box for a particular triangle have been processed and continuing the process until all triangles making up the display are processed.

All computations on all blocks concerned with a particular triangle are provided with the same computed distance and color rate of change values, the utilization of the rate of change values are weighted by the location of a particular pixel as 1) totally outside of a triangle, 2) totally interior of the triangle, or 3) within an anti-aliasing bounding region adjacent to each of the three sides of a triangle.

The method includes permitting the current color intensity value of the pixel in the frame buffer to remain unchanged if condition 1) above is found to exist; changing the value of the pixel based only on shading requirements if condition 2) above is found to exist; and changing the pixel value based on both shading and anti-aliasing requirements, if condition 3) above is found to exist.

The method further includes a procedure operable in each pixel processors for computing a pixel location variable (a) whose value, once computed, indicates which of conditions 1), 2) or 3) applies for a particular pixel.

The procedure begins with the triangle in the display which represents an object furthest from the viewer in the simulated 3D display.

BRIEF DESCRIPTION OF THE DRAWINGS

FIG.. 1 comprises a high-level functional block diagram illustrating the use of an SIMD architecture to practice the invention.

FIG. 2 comprises a geometrical drawing explaining how a particular computation is broken up and routed to the various processors to sequentially compute the necessary data.

FIG. 3 comprises a geometrical drawing illustrating how the rate of change of color data used for shading calculations is determined.

FIG. 15 comprises a sub routine for computing the anti-aliasing factor as shown in FIG. 14.

FIG. 16 comprises a flow chart illustrating the operations necessary to computing the "shaded rgb" values as shown in FIG. 14.

DESCRIPTION OF THE PREFERRED EMBODIMENT

The herein disclosed invention comprises a procedure by means of which an SIMD computer architecture can be used as an M×N pixel processor array to render quality three-dimensional color images into the frame buffer of an associated video display architecture to produce a two-dimensional display. The overall system includes a host processor including an attached video display unit wherein the host processor supplies the basic video data including display information concerning the individual three-dimensional triangles conventionally associated therewith. A coordinate processor is also included which can either be a stand alone processor or its functions can be performed by the host as a functional module. The coordinate processor performs initializing operations on the video data and controls the operation of and data supplied to the M×N pixel processor matrix organized as an SIMD architecture. The method includes a parallel algorithm executable within the M×N pixel processor matrix for rendering an important graphic primitive—a smoothly shaded color three-dimensional triangle with anti-aliased edges.

Figure 1:
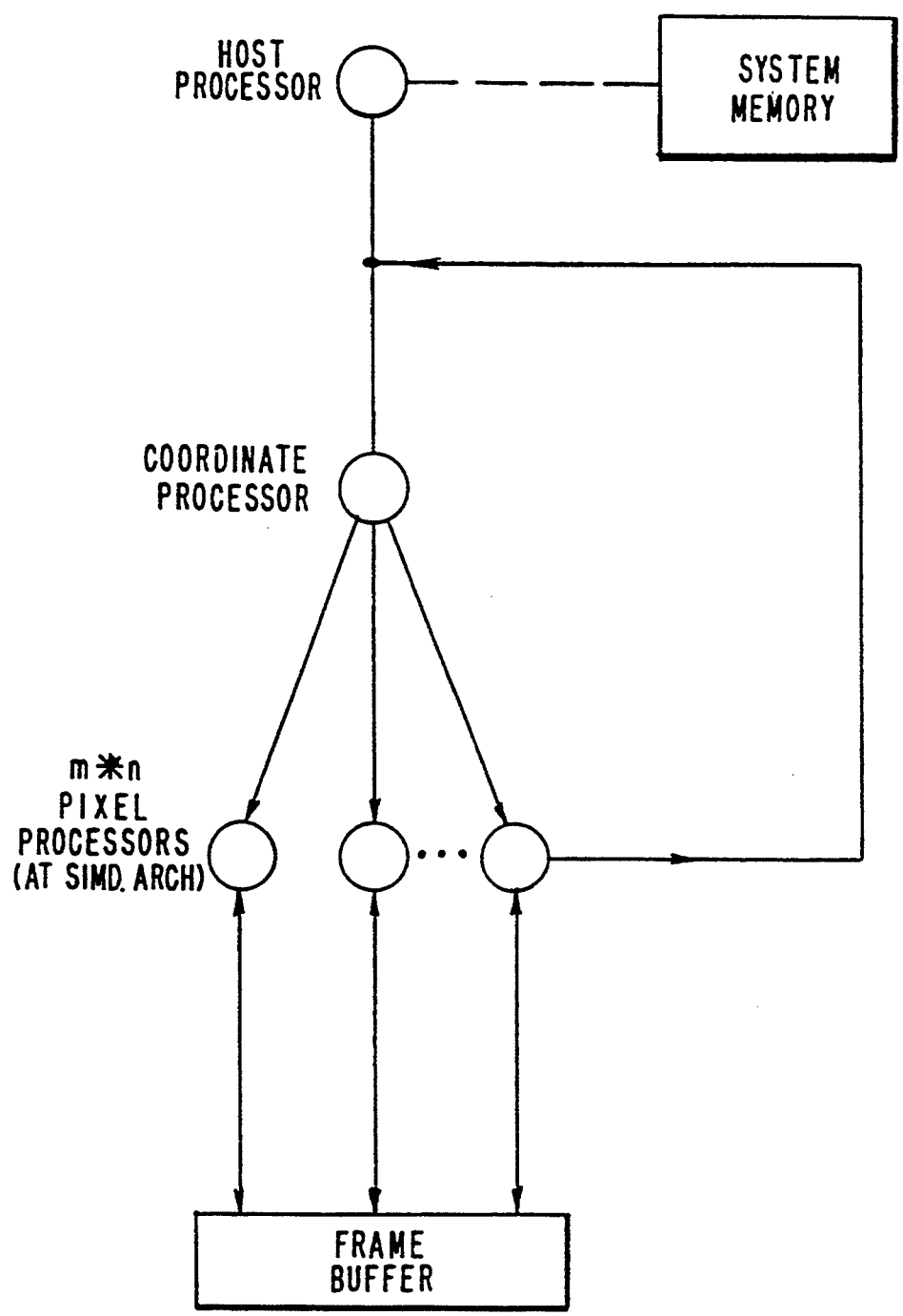

The overall system is shown in FIG. 1. This system comprises an SIMD architecture with the coordinate processor controlling a multiplicity of pixel processors. The organization and operation of SIMD architectures is well known in the art. A particular architecture is set forth in copending U.S. patent application No. 728990 filed Apr. 30, 1985 of L. Lumelsky. An important feature of the present organization is its ability to access and process multiple, multi-bit pixels in parallel. A second feature is the ability of a pixel processor to perform multiple independent operations on different segments of a pixel. Although the method to be described subsequently could be implemented on a system without SIMD architectural features, the lack of pixel and operational parallelism would substantially reduce the system performance.

At this point, it should be clearly understood that no claim is made that the geometry of shading and anti-aliasing is novel per se as the methods of obtaining this type of shading and anti-aliasing are well known in the field of computer image generation as will be apparent from the subsequent description in which references are made to prior art articles describing certain of the geometrical operations involved. What is deemed to be novel is the presently disclosed method of analyzing a particular triangle and surrounding it with a bounding box which is known to completely enclose the triangle and which is, in turn, composed of a plurality of constituent blocks having a dimension of M×N pixels. Assuming that the SIMD architecture is composed of M×N processors, each of said processors is uniquely connectable to the frame buffer in that it is able to access and analyze a particular pixel in each of said constituent blocks. It should further be understood that the entire frame buffer is organized into a plurality of said constituent blocks although only a certain contiguous subset will be involved in any particular bounding box.

Utilizing these basic organizational concepts of the array of M×N pixel processors relative to the frame buffer, a unique parallel algorithm has been devised. The coordinate processor precomputes certain data relative to a particular triangle being processed and transmits this information in parallel to all of the pixel processors which uniquely use this data in accordance with their own positional inter relationship within a constituent box to recompute or upgrade the color information originally stored in the frame buffer so that proper shading and anti-aliasing is accomplished.

According to one further aspect of the invention, a novel method of computing the anti-aliasing factors so that they may be utilized in the parallel algorithm is set forth which uniquely enables the processors to individually determine what effect an anti-aliasing factor will have on their computation and, if such an effect is necessary, to automatically include this in the computation.

The specific details of the invention will now be set forth. The overall process is illustrated diagrammatically in FIG. 1. The host processor starts the process by performing an initial set of calculations which are known and passes the results to the coordinate processor. Some of these results are passed on to the pixel processors by the coordinate processor. Then a series of iterations begin under the control of the coordinate processor. At the start of each iteration, the coordinate processor supplies a set a values to the pixel processors. The pixel processors use these values to calculate the triangle pixels and to combine the triangle pixels with the pixels currently stored in the frame buffer. At the beginning of the operation, the pixels currently stored in the frame buffer represent those placed there by the host processor without consideration given to shading and is anti-aliasing. The iteration is repeated within the pixel processors until the entire triangle has been rendered a constituent block at a time.

If there are M×N pixel processors, then one M×N block of pixels is processed during each iteration as described above. A simple way of covering the triangle is to process all the constituent blocks within its bounding box. This is illustrated in FIG. 2. A more efficient alternative would be to process only the constituent blocks which are wholly or partly within the triangle. In the presently disclosed embodiment, this is not done e.g. all of the constituent blocks are processed; however, it would be comparatively trivial for the coordinate processor to make the requisite calculations before performing the iteration which would evaluate a constituent block which laid wholly outside of the subject triangle being processed. In any case, the coordinate processor determines the order and selection of the blocks to be processed.

The following is a very brief description of the processing performed by each pixel processor. It will be elaborated upon subsequently. During each iteration, each pixel processor evaluates six variables using the linear relation:

$$v = vb + i^* vx + j^* vy$$

where vb is the value of the variable at the lower-left-hand pixel of a particular constituent block, vx is the variation of v with respect to x, vy is the variation of v with respect to y, and (i,j) are the indices defining the relative position of a particular pixel within the constituent block. The six variables are: Distances from the triangle lines to the pixel, dd1, dd2, dd3 and the colors, r,g,b. The rates of change with respect to x and y are supplied only once before the iterations begin. However, to maintain precision, the values at the lower-left-hand pixel of each constituent block could be supplied at the start of each iteration.

The distance variables are illustrated in FIG. 3. dd1, dd2, and dd3 are the distances from the three sides of the triangle to a particular pixel. A negative distance means the pixel is "outside" a line. A positive distance means the pixel is "inside" a line. A pixel is inside the triangle if it is inside all three triangle lines. The definitions dx and dy are illustrated in the insert to FIG. 3.

Thus to recapitulate, the following data is supplied to the pixel processor by the coordinate processor:

Upon each iteration of the pixel processors (per constituent block)
r,g,b, d1, d2, and d3.
Once for each triangle (per bounding box)
Rx, gx, bx, d1x, d2x, d3x;
ry, gy, by, d1y, d2y, d3y.
The way this data is used in the overall process will be set forth more fully subsequently.

Figure 4:
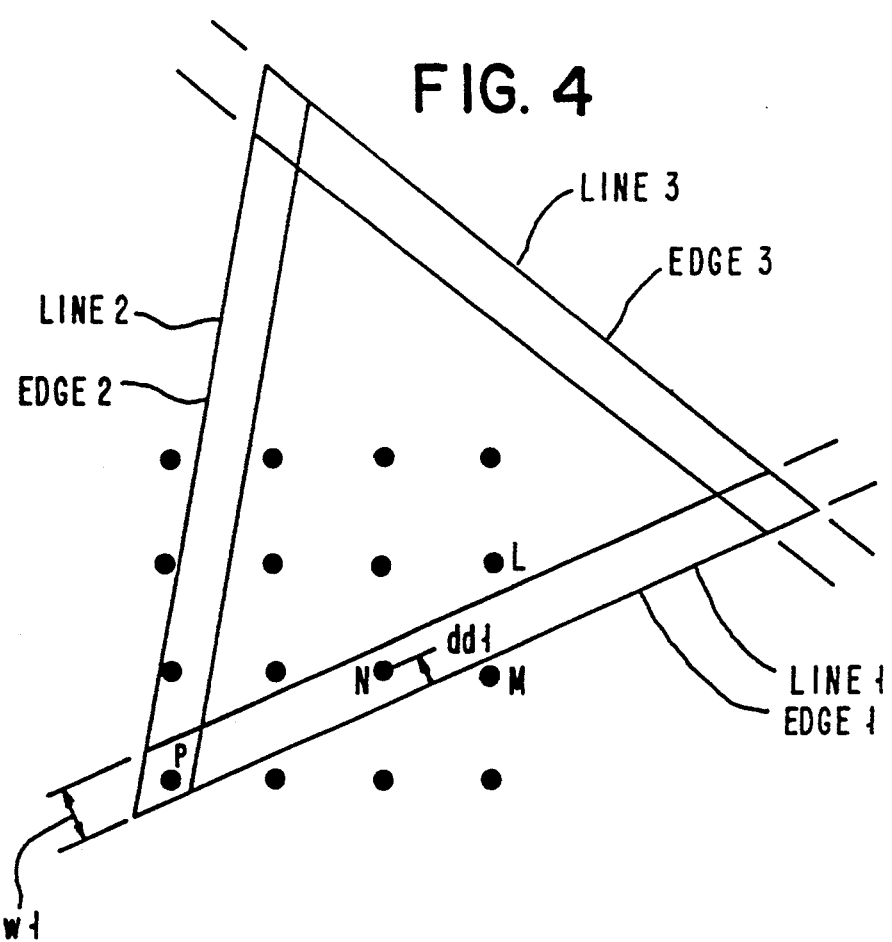
FIG. 4 comprises a geometrical drawing illustrating how anti-aliasing data is generated.

To understand how the anti-aliasing computation is performed according to the present invention reference should be made to FIG. 4. The three distances, dd1, dd2, and dd3 are used to calculate the anti-aliasing factor (a). (a) takes care of anti-aliasing at triangle edges and helps determine how to combine the triangle pixel with the contents of the frame buffer. There are many ways of calculating (a). A simple technique will be described here. The idea is to treat the triangle as if it were a three-dimensional object with beveled edges. The bevel is defined by the three lighter lines within the primary heavier lines defining the triangle as shown in the figure. (a) is defined to be the height of the triangle at the center of the pixel. The width, wk, of the beveled region is a function of dxk and dyk. In this case, let wk=max(=dxk=, =dyk=) and define the height of the triangle in the interior region to be one. Thus, the height outside the triangle is zero and the height within the bevel is some value between zero and one.

For each edge, k(1,2,3,) each pixel processor uses the distance, ddk, from the line containing the edge to get the value ak. The ak's are defined as follows:

if ddk ≦0 then ak=0, if 0<ddk<wk then ak=dk/wk, and if ddk≦wk then ak=1.

When all three edges are taken into account, a=min-(a1,a2,a3,) FIG. 4 shows several examples of pixels relative to their location outside of the triangle, inside of the triangle, and within one or more of the beveled edges.

EXAMPLES

L is totally within the triangle, (a)=1
M is totally outside the triangle, (a)=0
N is on one edge of the triangle, 0<(a)<1
P is on two edges of the triangle, 0 <(a)<1

Figure 5:
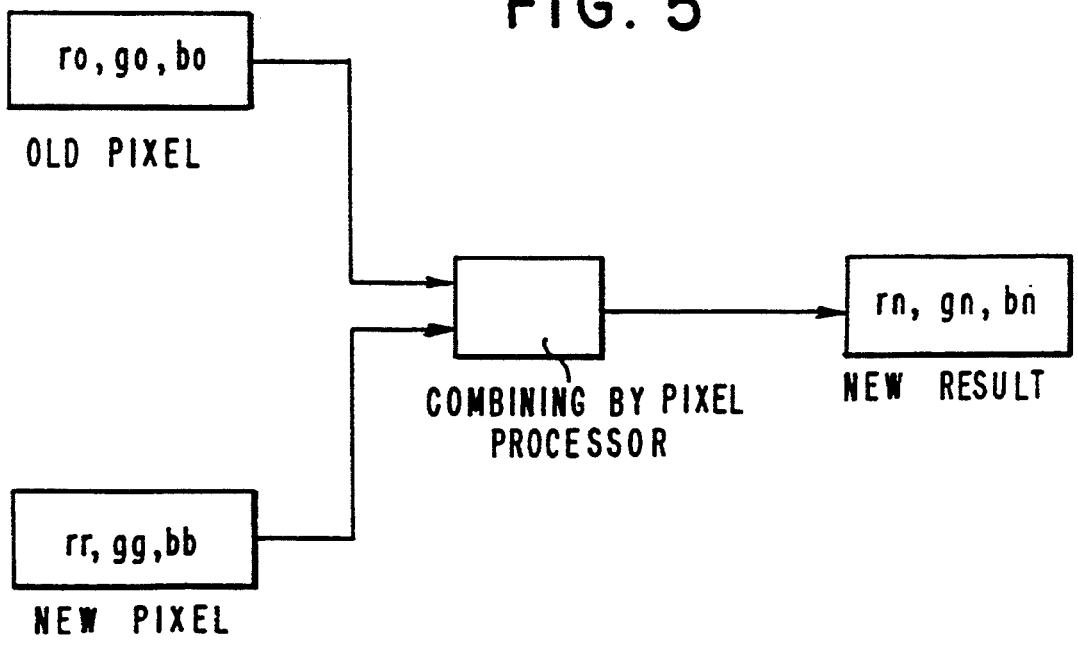
FIG. 5 is a flow diagram illustrating data flow in the system which results in the recomputed shading and anti-aliasing video information.

The last step is to combine the triangle pixel values with the contents of the frame buffer. This is diagrammed in a very high-level fashion in FIG. 5. The old pixel values are depicted as being within the block entitled "old pixel" and comprise values ro, go, bo. The new values computed by the present system are depicted as being within the box marked "new pixel" and comprise rr, gg, bb. The way that these values are specifically computed will also be set forth in detail subsequently. These values are combined by the pixel processor as illustrated and the combining function is controlled by the anti-aliasing factor computed for that particular pixel by the present procedure. The new results of this computation are returned to the frame buffer and indicated by the block "new result" and comprise rn, gn, bn.

Having thus generally described the overall procedure of the present invention, the specific details of the operation will now be set forth with respect to FIGS. 6 through 23. It is pointed out that the following description refers specifically to the preferred embodiment and may differ in certain minor respects from the general description immediately preceding.

As is well known in a color display, a pixel is represented by the three primary colors, red, green and blue. Further, in conventional frame buffer storage systems, a particular pixel value is a composite of the three primary colors wherein a digital code represents the intensity value. Accordingly throughout this write-up, a particular pixel value consisting of the three primary colors is simply referred to as rgb.

A number of assumptions are made about the individual triangles making up an overall display in the host before they are sent to the coordinate processor. It is assumed that an rgb value has been assigned to each vertex of each triangle in the manner described in [1] and on page 30 of [5]. These shading values are the intensities of r,g,b at each vertex. The shading values will be linearly interpolated for points in the triangles by the coordinate processor and the individual pixel processors.

It is assumed that the three-dimensional surface has been projected onto a two-dimensional surface as well known in the art and described in Chapter 8 of reference [3]. It is also assumed that the triangles are depth sorted (by z value) as described by [4] and page 558 in [3]. The triangles closest to the background are sent to the coordinate processor for processing first. The triangles next to the background will be anti-aliased with the background by the pixel processors. Later triangles may cover parts of the previously processed edges. This will of course result in a modified rgb intensity value being stored in those pixel locations within the frame buffer as will be described subsequently.

It is further assumed that the triangles have been received by the coordinate processor enlarged slightly. This allows the "beveled" areas to overlap. As stated previously, the beveled areas are the thin strip inside a triangle where pixels are anti-aliased and the use of these bevels in determining an anti-aliasing value (a) will be described later. For the present implementation since the triangles are enlarged first, first the edge of a triangle is anti-aliased with an edge in the background. Later that edge is anti-aliased with an edge of a triangle in the foreground. In this manner, an edge of a triangle close to the viewer has been anti-aliased with two shaded pixels.

The amount of enlarging performed before the host transmits the triangles to the CPU uses the same geometry shown in the embodiment. The enlarging on each triangle is by its corresponding bevel width.

It is quite possible that other implementations of the basic invention disclosed herein may not have the beveled areas overlap. Whether they do or not does not effect the basic structure of running the pixel processors in parallel.

Figure 6:
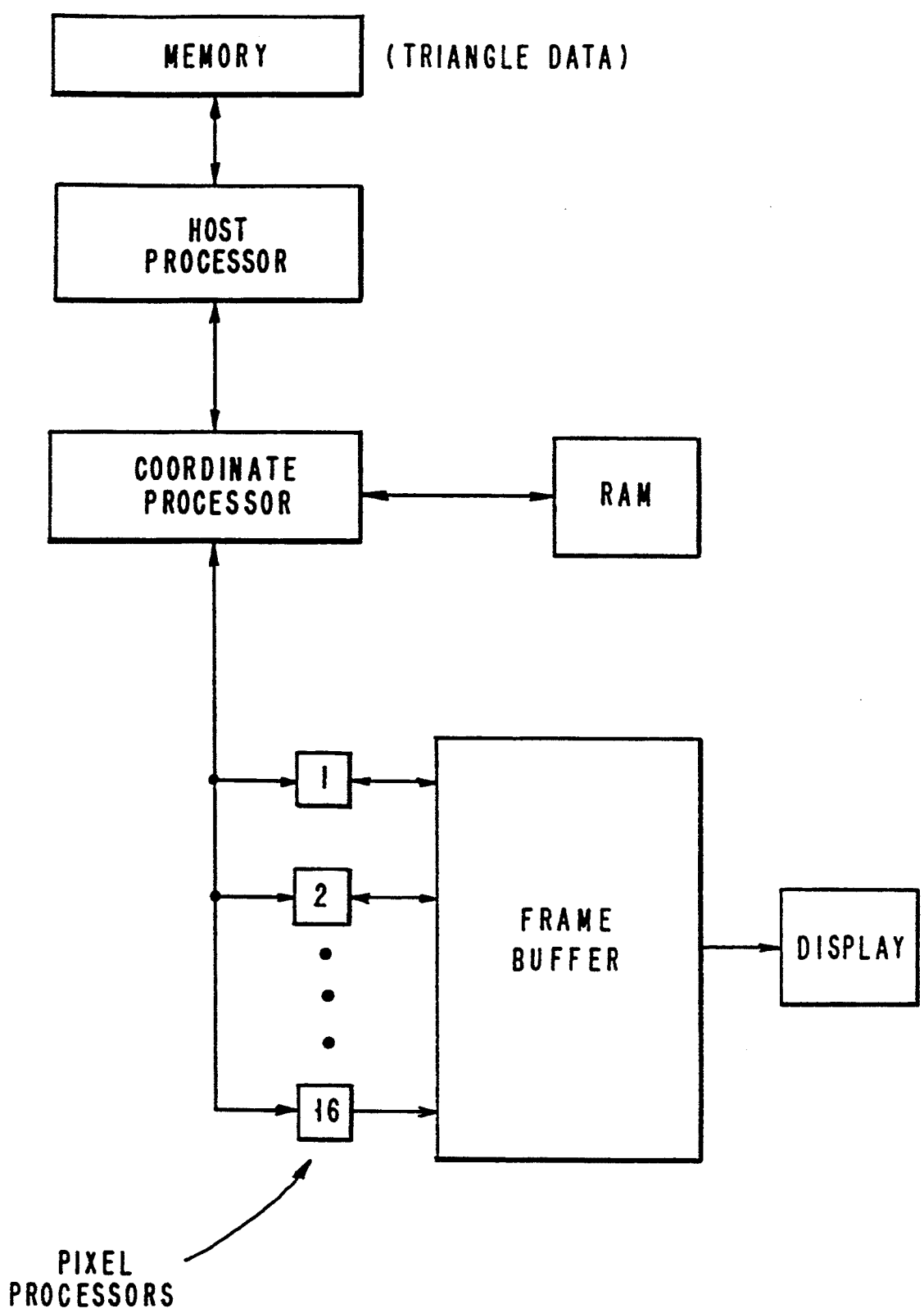
FIG. 6 comprises a high-level functional block diagram of the overall system in somewhat more detail than FIG. 1 showing all of the major functional components in the system and their relationship to each other.

FIG. 6 illustrates a system diagram with the host processor passing a description of triangles from its memory to the control processor. The control processor stores data tables in its RAM which it computes from triangle data received from the host. The control processor will in turn pass data to the pixel processors which run as a "single instruction multiple data" (SIMD) architected system such as disclosed in reference [2]. As will be apparent from the previous discussion in the following description, all of the pixel processors execute precisely the same program although they will of course be processing different data values due to their own unique position in the particular M×N constituent block.

It should be noted at this point that in the present embodiment, it is assumed that there are sixteen pixel processors (e.g. 4×4) in the SIMD architecture; however, it is obvious that this is merely chosen for convenience of representation. Any value of M×N could be used depending on the desired system performance.

Each of the sixteen illustrated pixel processors has access to one sixteenth of the frame buffer. Stated differently, each processor can access selectively every sixteenth pixel stored in the frame buffer. The organization of this access may be designed into the system. For the present invention, it is assumed that the frame buffer is organized into a set of blocks which are referred to herein as constituent blocks each block being four pixels by four pixels. Thus each pixel processor according to the design of the system has access to a particular pixel in each of the constituent blocks making up the entire frame buffer which pixel of course will be in the same relative position in each block.

The output of the frame buffer drives the display at whatever refresh rate is required thereby and does not form a part of the present invention.

Figure 7:
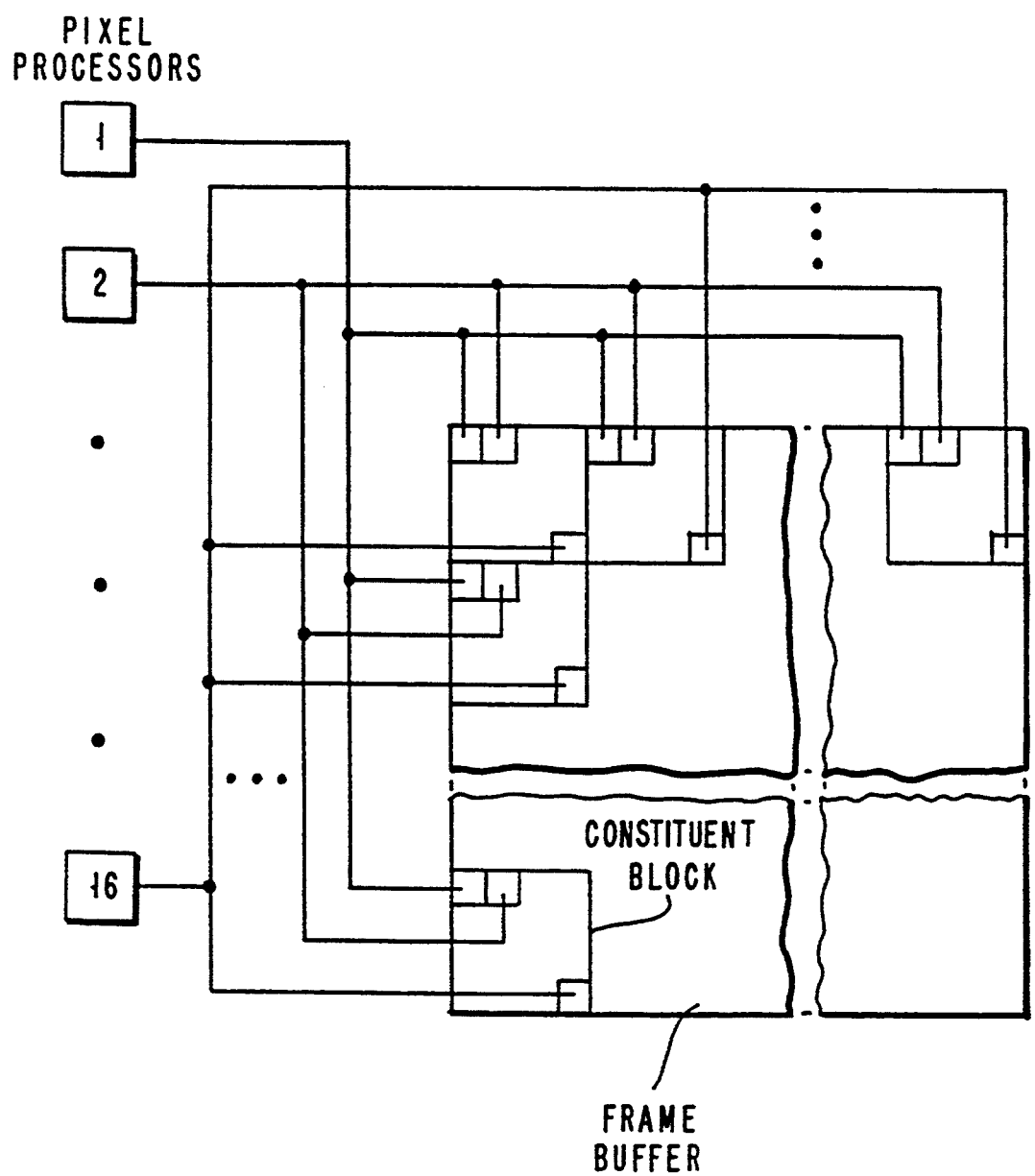
FIG. 7 comprises a diagram illustrating the functional relationship between individual pixel processors and the assigned sections of the frame buffer as utilized in practicing the present invention.

FIG. 7 illustrates graphically the organization of the pixel processors and their relationship to a predetermined relative position of a pixel within each of the constituent blocks making up the frame buffer. Thus in each constituent block, the pixel processor 1 is connected to the upper-left-hand pixel in the four by four array and pixel processor 16 is connected to the lower-right-hand pixel. Selection means, not shown, would of course assure that the pixel processors are only connected to an r,g,b triplet of values in a single constituent block during any one processing cycle as will be well understood.

Figure 8:
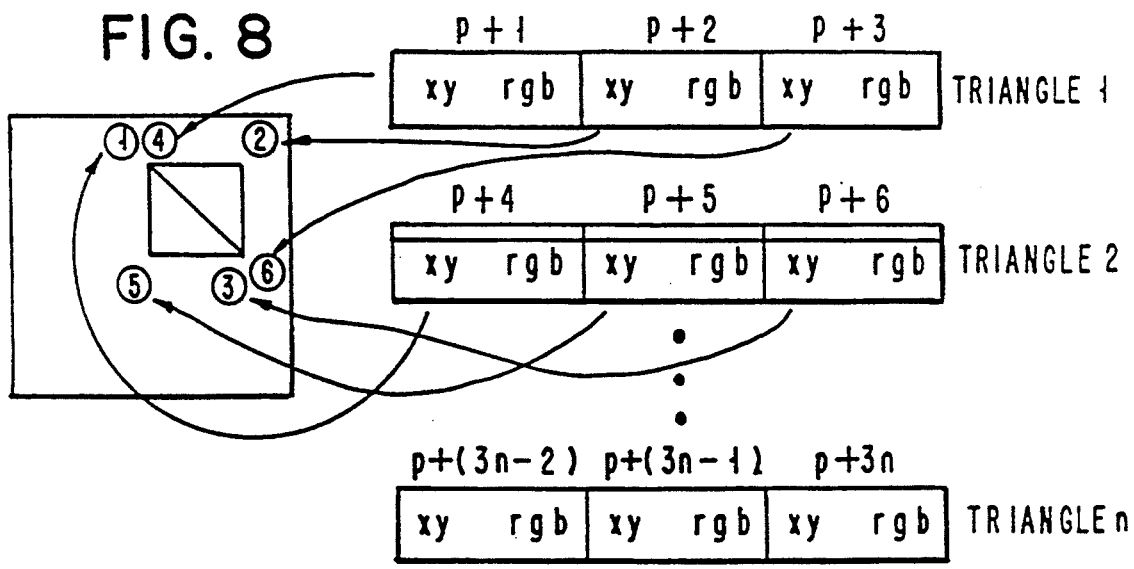
FIG. 8 is a diagram illustrating two triangles on the display screen and their locating coordinates as they would appear on the display screen and also the data format of the coordinates which define each triangle making up the display which must be transferred from the host to the coordinate processor during the practice of the present invention.

FIG. 8 shows the triangle geometry records which describe each of the triangles making up the total display as they would be stored in the host. As will be understood, each triangle is represented by a set of three point vertices. Each point can be identified by an xy address coordinate and by a color intensity value rgb. These records are transmitted by the host to the coordinate processor. As stated previously, each corner of the triangle is defined by its xy coordinates and its color which color is used for the Gourard shading as described in reference [1]. Also, the triangles, at this stage, are assumed to have been depth sorted. These triangle geometry records are processed by the coordinate processor to produce data records which are in turn sent to the individual pixel processors.

Figure 9:
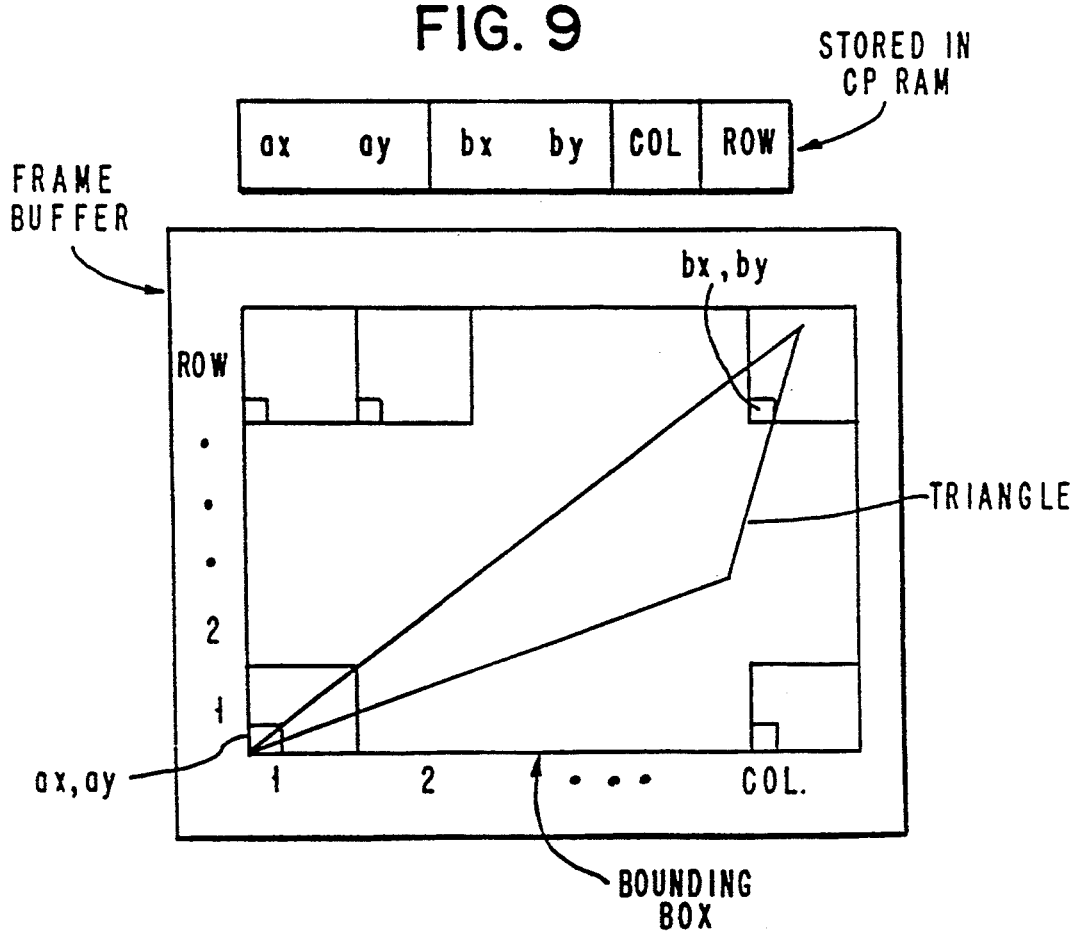
FIG. 9 comprises of the data format and a related diagrammatic illustration of the coordinates of the individual blocks within a bounding box which are periodically sent to each pixel processor and are used within the coordinate processor to control the repetitive operations within the method.

FIG. 9 illustrates a triangle placed in the frame buffer (diagrammatically) with its bounding box and a number of constituent blocks making up the bounding box. The diagram at the top of the figure illustrates the data record generated by the coordinate processor and kept for the purpose of identifying the progress of the operation as a given bounding box and its constituent blocks are processed. It should be clearly understood that this merely represents the record keeping of the coordinate processor and not the triangle geometry calculations. It should also be understood that the bounding box is shown as exactly lying on or being congruent with the lower-left-hand corner of the triangle and being substantially outside and above the upper-right-hand corner of the triangle. In all probability, the bounding box would be totally outside of all the points of the triangle. The requirement is that it must totally enclose or surround the triangle and must be made up of complete four by four constituent blocks that are addressable in a predetermined fashion in the frame buffer as will be understood.

Referring again to the diagram at the top of FIG. 9, it will be noted that the coordinates ax, ay defines the origin of the first constituent block within the bounding box and the coordinates bx, by comprise the coordinates of the origin of the last constituent block within the bounding box. The field marked column "col" and "row" refer to the number of rows and columns of constituent blocks within the bounding box. As will be appreciated, this data is used together with counters to control the number of iterations of the present computations in order to completely evaluate a given triangle.

Figure 10:
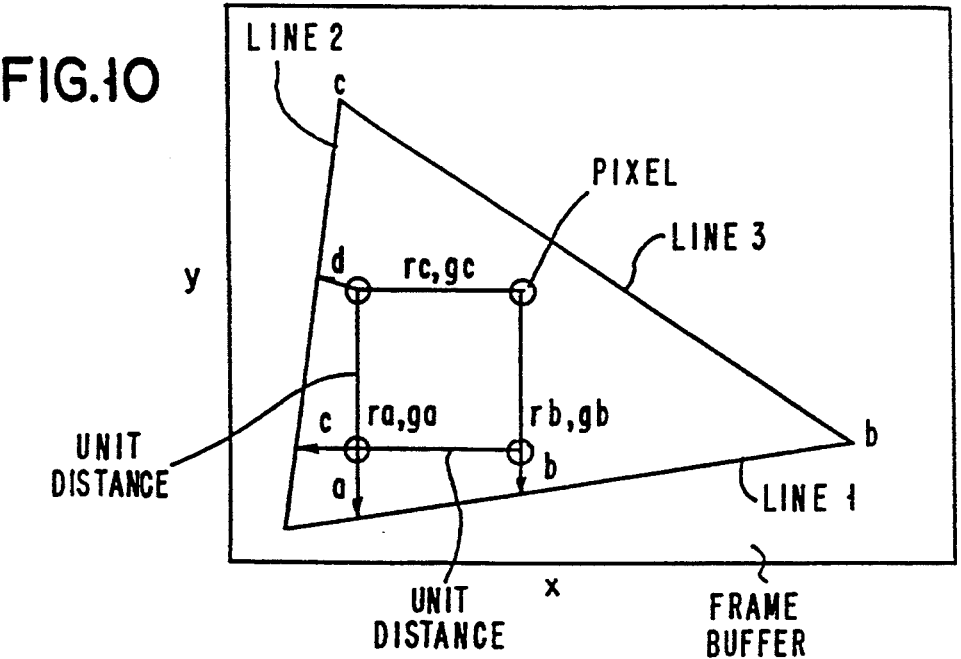
FIG. 10 comprises the data format for a single "triangle record" and related diagrammatic illustration of set of data periodically transmitted from the coordinate processor to each pixel processor which is identical for a complete bounding box of a triangle.

FIG. 10 illustrates a triangle record which is passed from the coordinate processor to all of the pixel processors. This data will be used when each constituent block in the triangle's bounding box is processed. All the data is rate data except w1, w2, and w3 which refers to the bevel widths whose use will be described later.

As illustrated in the diagram at the top of the figure, the rate of change of the three distances with respect to both the x and y coordinate are shown. These are d1x, d1y; d2x, d2y; and d3x, d3y. These represent the rate of change of distance to the three sides of the triangle as a point moves a unit distance in the x and the y direction. This record also contains the three items of rate of change color data e.g. rx, ry; gx, gy; and bx, by. These latter six values represent the rate of change of intensity of the three primary colors again as a pixel moves a unit distance along either the x or y axis. The following example illustrates the computation of several of these variables referenced to the Figure which computations are well known in the art and are adequately described in the references cited.

EXAMPLE

| | |
|---|---|
| $d1x = b - a$ | (The change in distance relative to edge 1 for moving pixel in the x direction) |
| $d2y = d - c$ | (The change in distance relative to edge 2 for moving 1 pixel in the y direction) |
| $rx = rb - ra$ | (The change in intensity of the color red for moving 1 pixel in the x direction) |
| $gy = gc - ga$ | (The change in intensity of the color green for moving 1 pixel in the y direction) |

Figure 11:
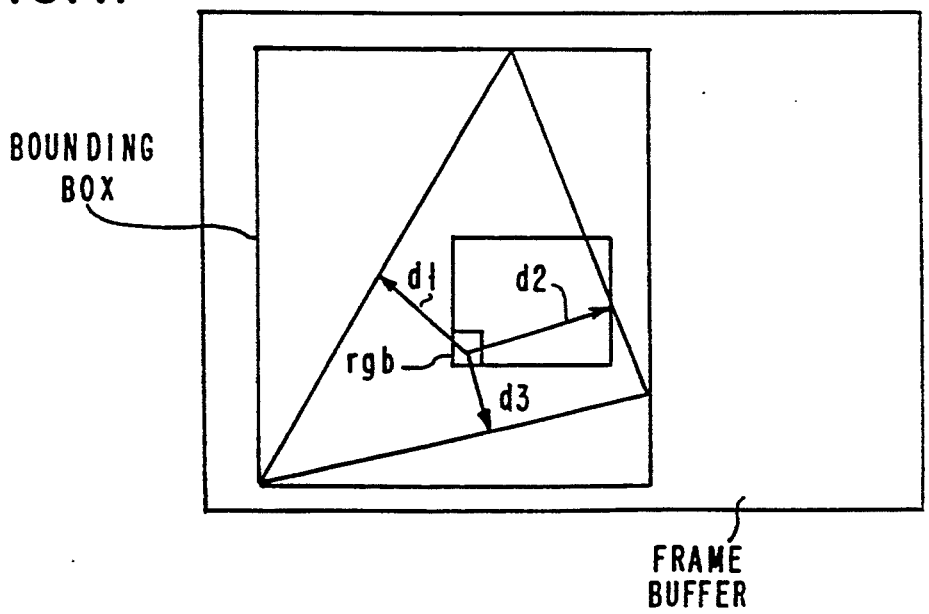
FIG. 11 comprises a data format for a "block record" and accompanying diagrammatic representation of data sent from the coordinate processor to each of the pixel processors which data is revised for each constituent block within the bounding box.

FIG. 11 illustrates a constituent block record and the meaning of its elements. A triangle and a constituent block within a bounding box are shown in the lower part of the figure. It is also noted that the bounding box is shown as ideally touching the three corners of the triangle although in most situations this would not be the case. Shown in the upper part of the figure are the calculated rgb intensities and the distance to the triangle edges for the corner pixel of a constituent block. The sixteen pixel processors will each process one of the pixels in the four by four block. The pixel processors processing pixels which are not in a corner use the triangle rate data to calculate the distance and rgb values to calculate their particular distance and rgb values from their knowledge of their relationship to the origin pixel and thus compute shaded, anti-aliased values which are to be updated in the frame buffer.

Figure 12:
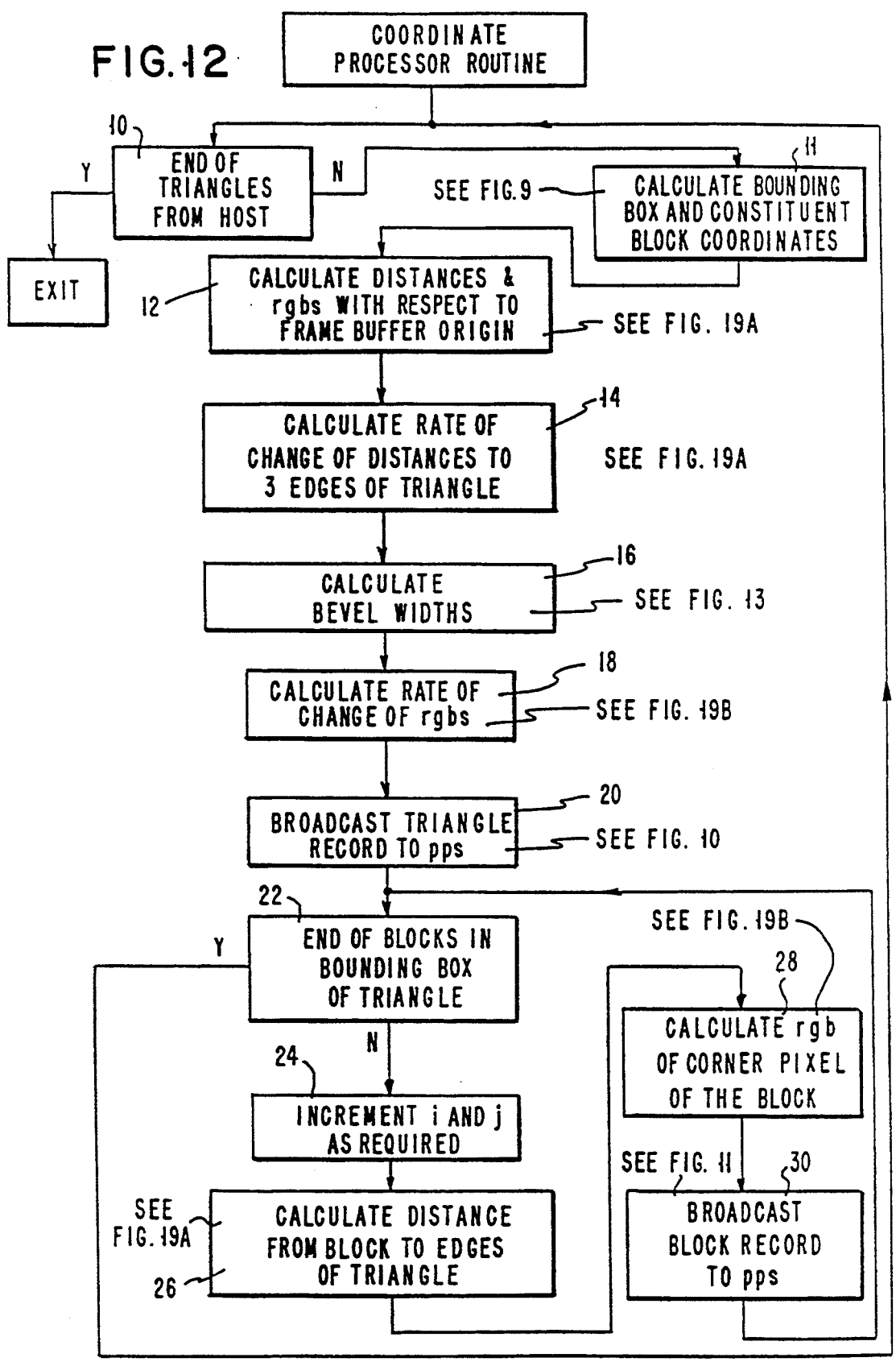
FIG. 12 comprises a flow chart of the sequence of operations which occur in the coordinate processor in carrying out the method of the present invention.

FIG. 12 comprises a flow chart of the coordinate processor routine for the first and preferred embodiment of the invention. It is believed that the flow chart is self explanatory in as far as the particular functions required. Reference is appropriately made in the figure to subsequent figures which show details of the particular operations specified in the various blocks of this flow chart.

Block 10 implies the receipt of successive triangle data from the host processor wherein a new triangle will be accessed from the host when a previous one has been completely evaluated until all triangles have been processed. Triangle record data is computed in blocks 12 through 20 and sent to all of the individual pixel processors. It is noted that this data is the same for all iterations of the pixel processors concerning a single triangle or bounding box.

Block 22 controls the consecutive iterations of the pixel processors as they compute data for each successive constituent block. The data illustrated in FIG. 9 is of course utilized for this purpose. Blocks 24 through 30 compute the data which is unique to each constituent block and must be updated on each iteration of the pixel processors. This data is illustrated in FIG. 11.

Thus to recapitulate, for each triangle a plurality of constituent blocks within the triangle bounding box are processed. In this manner, the data is sent from the coordinate processor to the individual pixel processors. General data is sent about the triangle once via block 20; and upon each iteration of the pixel processors, the new constituent block data is sent as shown in block 30 of the figure. Thus, all of the required data is sent to the pixel processors. In the pixel processors, the frame buffer will be read and written and anti-aliased and shaded rgb values will replace or be combined with values previously in the frame buffer.

The distances and rgb values as illustrated in FIG. 10 with respect to the origin of the frame buffer are calculated. These are used in the inner loop of the coordinate processor procedure to calculate the distances and rgb's with respect to each constituent block in the bounding box. As will be seen later, formulas for calculating values with respect to a constituent block use the distance and rgb values from the origin of the frame buffer as a reference. Similarly, the formulas in a pixel processor for calculating with respect to a given pixel use values known with respect to the origin of a particular constituent block.

Thus, the rate changes in distance and rgb intensity are calculated once for a triangle (bounding box) and used for each constituent block in the coordinate accessor's computations and later are used for each pixel's computations within the individual pixel processors.

It will be noted that the majority of the computational blocks in FIG. 12 indicate references to other figures which detail the particular function being performed in the indicated blocks. It will also be noted that in a number of the blocks of the flow chart, reference is made to performing certain operations within a particular "block". This of course refers to the constituent blocks which are determined to lie within a particular bounding box.

Figure 13:
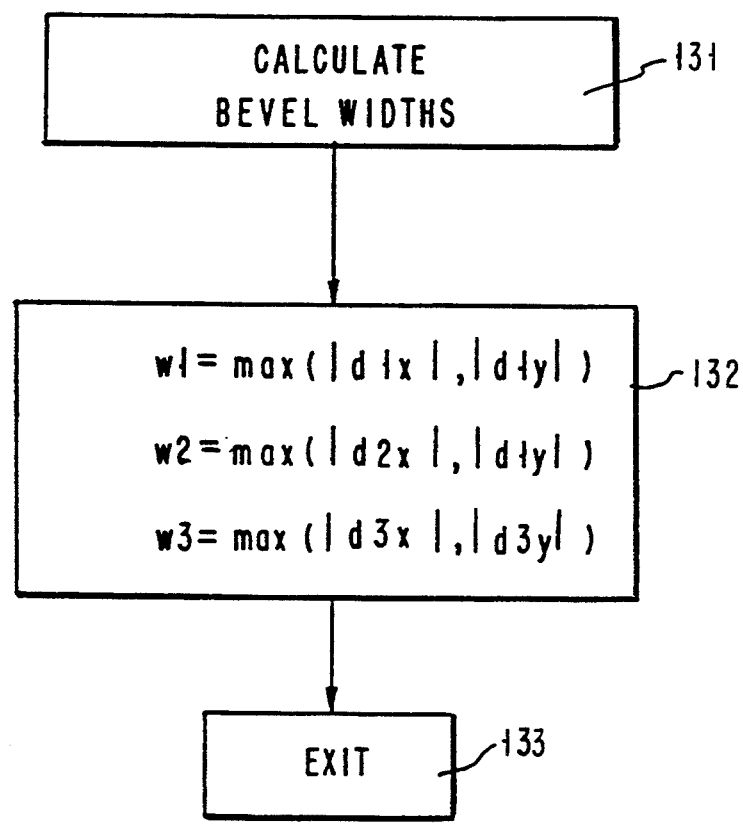
FIG. 13 comprises a flow chart of the steps involved in the "calculate bevel width" block of FIG. 12.

FIG. 13 illustrates the mathematical operations involved in performing the calculation of the beveled width wk. In this figure, block 131 indicates the entry into the routine. Block 132 indicates the three calculations for the three bevels and block 133 indicates an exit. As will be noted, the significance of the bevel is that it is a function of the rate of change of distance. Thus, the rates of change along both the x and y coordinates are compared and the larger is chosen.

Figure 14:
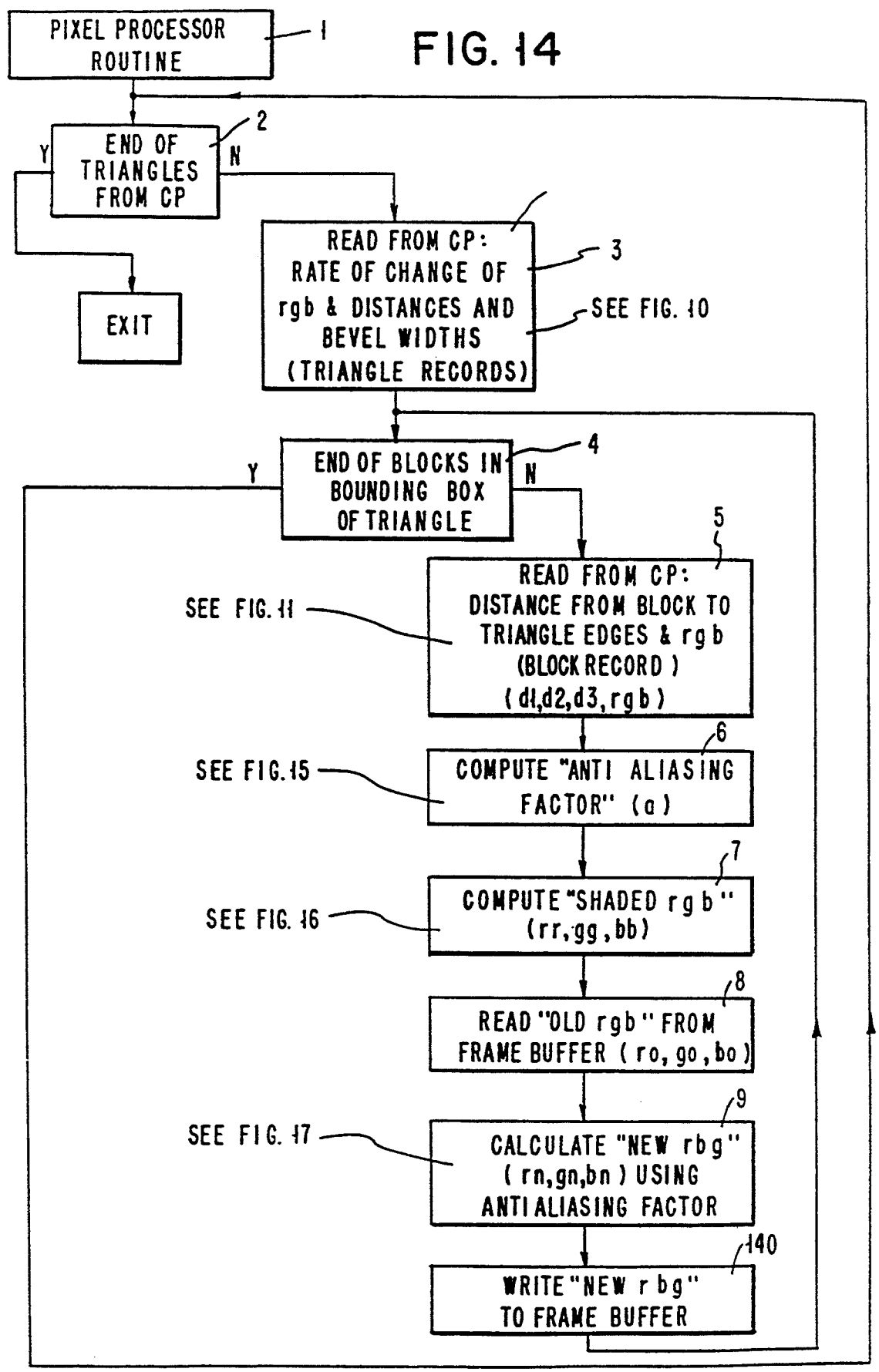
FIG. 14 comprises a high level flow chart of the operations which occur within one of the pixel processors of the SIMD processor in carrying out the sequence of operations necessary in performing the method of the present invention.

FIG. 14 is a flow chart for the pixel processor routine. It is this routine which is run in parallel in all of the sixteen processors (M×N) of the SIMD architecture and, together with the preprocessing done by the coordinate processor as set forth in FIG. 12, comprises the essence of the present invention. It is this routine which is run in each of the pixel processors from beginning to end on each iteration as the block of sixteen pixel processors computes the data for a new constituent block. Even though the anti-aliasing factor computed early in the routine is determined to be zero which indicates that a pixel is outside of the triangle and will result in no change in the stored value within the frame buffer; the method is still run through completely in order to maintain the full parallelism of the program which is of course necessary with SIMD architectures.

Referring now to the figure, block 1 indicates the initiation of the procedure. Block 2 indicates that a test is made to determine if all the triangles making up the complete image have yet been processed. If not, the system continues to block 3.

In block 3, the pixel processor obtains the data from the coordinate processor which is constant for a complete triangle or bounding box. These are the rates of change of rgb, the rate of change of distances and the bevel widths as shown in FIG. 10. The procedure then continues to block 4 where a test is made to determine if there are any more constituent blocks within a bounding box for a particular triangle. If the last constituent block has been processed, the procedure branches back to block 2, otherwise it proceeds to block 5.

In block 5, the data is read from the coordinate processor that is specific to the particular constituent block being processed. These include the three distances from the origin of the constituent block to the triangle edges and the color intensity values rgb. This is the constituent block record which was described previously with respect to FIG. 11. The procedure then moves to block 6 wherein the anti-aliasing factor (a) is computed. The details of this computation are explained in FIG. 15.

In block 7, the shaded color intensity values rgb which are indicated in the figures as rr, gg, bb are computed as detailed in FIG. 16.

At this point, it should be noted that what is being done by the system is that a determination is made as to whether a computed shaded value or the old value from the frame buffer or a fraction of the two is written back into the frame buffer. To do this, blocks 8, 9 and 140 are invoked.

Block 8 reads the old color intensity values from the frame buffer, ro, go, bo. Block 9 calculates the new color intensity values rn, gn, bn using the anti-aliasing factor as detailed in FIG. 17.

Block 10 causes the new color intensity value to be stored in the frame buffer at the appropriate pixel location.

This ends the pixel processor routine and the procedure returns to block 4 where tests are made to see if there are any remaining constituent blocks to be processed for the particular triangle.

FIG. 15 shows the computation of the anti-aliasing factor (a). The i and j values shown in the computation block 152 are unique to each particular pixel processor and determine that the pixel processor is working on its particular pixel in the block. Thus, the pixel processor computing the pixel in the lower-left-hand corner or origin of a constituent block would have values $i=0$, $j=0$. Conversely, the pixel processor processing the pixel in the upper-right-hand corner of the constituent block would have the values $i=3$, $j=3$ etc.

Figure 18:
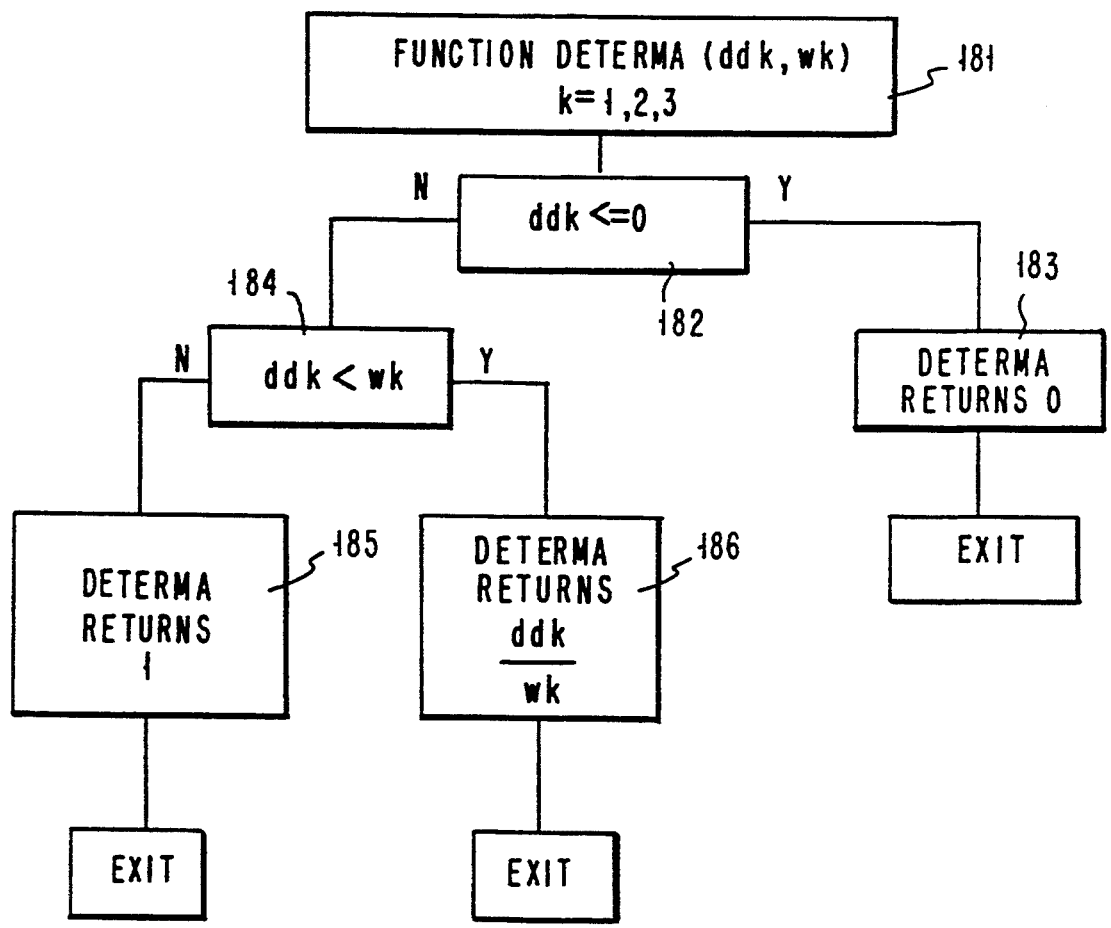
FIG. 18 comprises a flow chart of the sub routine utilized to calculate the function "determa" which is utilized within the sub routine for computing the anti-aliasing factor as shown in FIG. 15.

The function "determa" is in turn detailed further in FIG. 18. This function is invoked three times to determine the three anti-aliasing factors a1, a2, a3. In each instance the appropriate value of ddk and wk are utilized as will be understood.

Finally, the anti-aliasing factor (a) for that particular pixel is determined as the minimum of a1, a2, a3. This value is used in the computation block 9 of FIG. 14 which will also be well understood.

The following are brief definitions of the variables shown in block 162 of FIG. 15.

| | |
|---|---|
| d1,d2,d3 | are distances, read from the coordinate processor, from the origin of a constituent block to the three edges of the triangle |
| i,j | are indices unique to each pixel processor specifying the location of the pixel in the constituent block - they vary from 0–3 as explained above |
| dd1,dd2,dd3 | are computed distances from a pixel to the triangle edges |
| "determa" | is a function which returns (a) which is, in turn, based on a distance and bevel width for each edge |
| (a) | is the anti-aliasing factor |
| w1,w2,w3 | are the bevel widths (wk) read once from the coordinate processor for each triangle. |

FIG. 16 illustrates the computation of the shaded color intensity values of block 7 of FIG. 14. As described previously with respect to FIG. 15, i and j are indices which are unique to the particular pixel processor and allow the particular pixel processor to adjust for its own particular pixel location in the constituent block. As will be apparent, the values r, g, b, utilized in the computation block 2 of the figure, were transmitted to the pixel processor in block 5 from the coordinate processor. The values rx, ry, gx, gy, bx, by, were transmitted to the pixel processors and the coordinate processor in block 163.

The following are brief definitions of the variables shown in the computation block 162 of FIG. 16.

| | |
|---|---|
| r,g,b | are color intensity values read from the coordinate processor for each constituent block. |
| i,j | are indices identical to those of FIG. 15 and vary from 0–3. |
| rx,ry gx,gy bx,by | are rate of change of color values along the x and y axes and are read once from the coordinate processor for each triangle (bounding box). |

Figure 17:
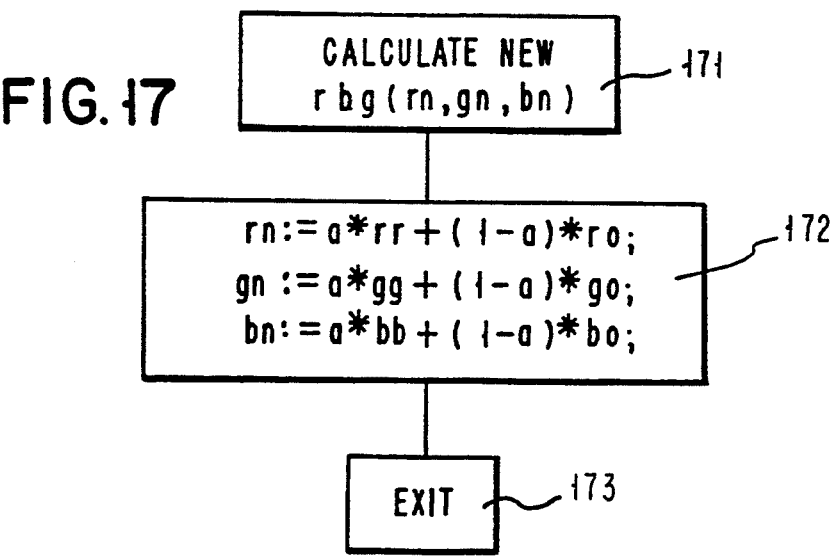
FIG. 17 comprises a sub routine illustrating the calculations necessary to produce the new red, blue and green values (rn,gn,bn).

FIG. 17 illustrates the anti-aliasing factor (a) being utilized to generate a new color intensity value rn, gn, bn to be returned to the frame buffer at the particular pixel location at the end of the pixel processor procedure. All of the variables in the computational block 2 of FIG. 17 have been defined. Anti-aliasing factor (a) was computed in the procedure outlined in FIG. 15 and the shaded color intensity values rr, gg, bb were computed in the procedure detailed in FIG. 16 and the old color intensity values ro, go, bo are accessed from the frame buffer at the appropriate pixel location.

As one further note to the procedure of FIG. 17, as stated previously, the anti-aliasing factor (a) may be a 1, a 0, or a fraction, the new color is a new (n) computed shaded value, the old (o) value in the frame buffer or a fraction of each. If (a) is a 1, the new pixel value for the pixel just computed is placed unaltered in the frame buffer, if it is a 0, it is known that the pixel is outside the triangle and the old value in the frame buffer will be left unaltered; or finally if (a) is a fraction, this fraction is used to accomplish the anti-aliasing in accordance with the procedure shown in the figure.

FIG. 18 specifies the computations involved in determining whether the anti-aliasing factor (a) for the particular triangle edge relative to the pixel being processed is a 1, 0 or a fraction. As will be apparent, this procedure is followed to determine three anti-aliasing factors, a1, a2, a3 for each of the three edges of the triangle relative to a given pixel being processed. In block 182, the rate of change of distance ddk is compared with 0. If it is less than 0, the system proceeds to block 183 and the procedure returns a value of 0 for that particular anti-aliasing factor. If not, the procedure continues to block 184 where the value ddk is compared with the width wk. If ddk is greater than wk, the system proceeds to block 185 and the procedure returns a value of 1 for the particular value of ddk. If ddk is less than wk, the system branches to block 186 where the specified ratio ddk/wk is returned as the value of the anti-aliasing factor for that edge. Regardless of which path is taken, the function will take the same time to be executed. This will allow the pixel processors to all execute in parallel, as required of such an SIMD architecture.

Figure 19A:
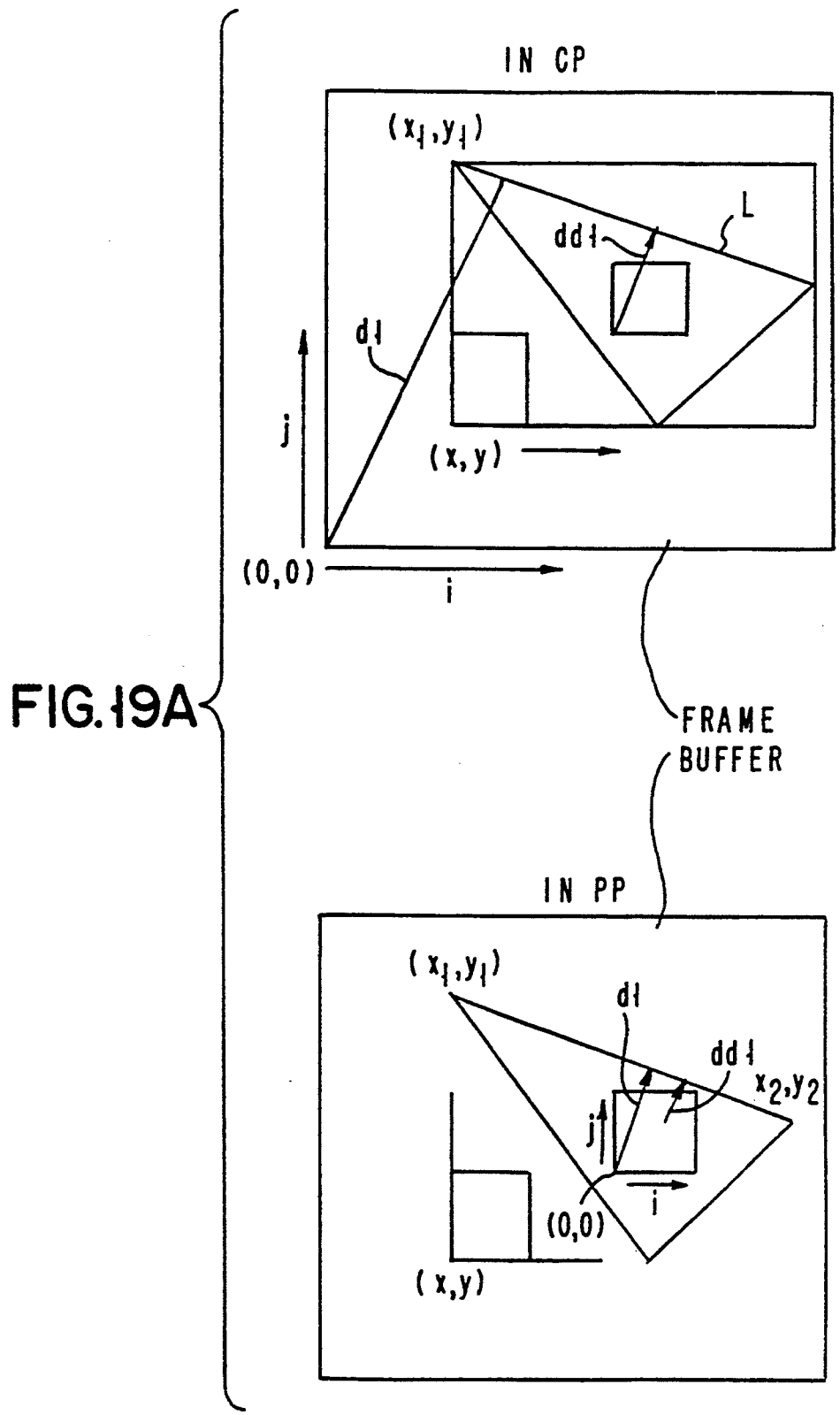
FIGS. 19A and 19B are diagrammatic illustrations of the geometric calculations performed by the coordinate processor and referenced in FIG. 12.
Figure 19B:
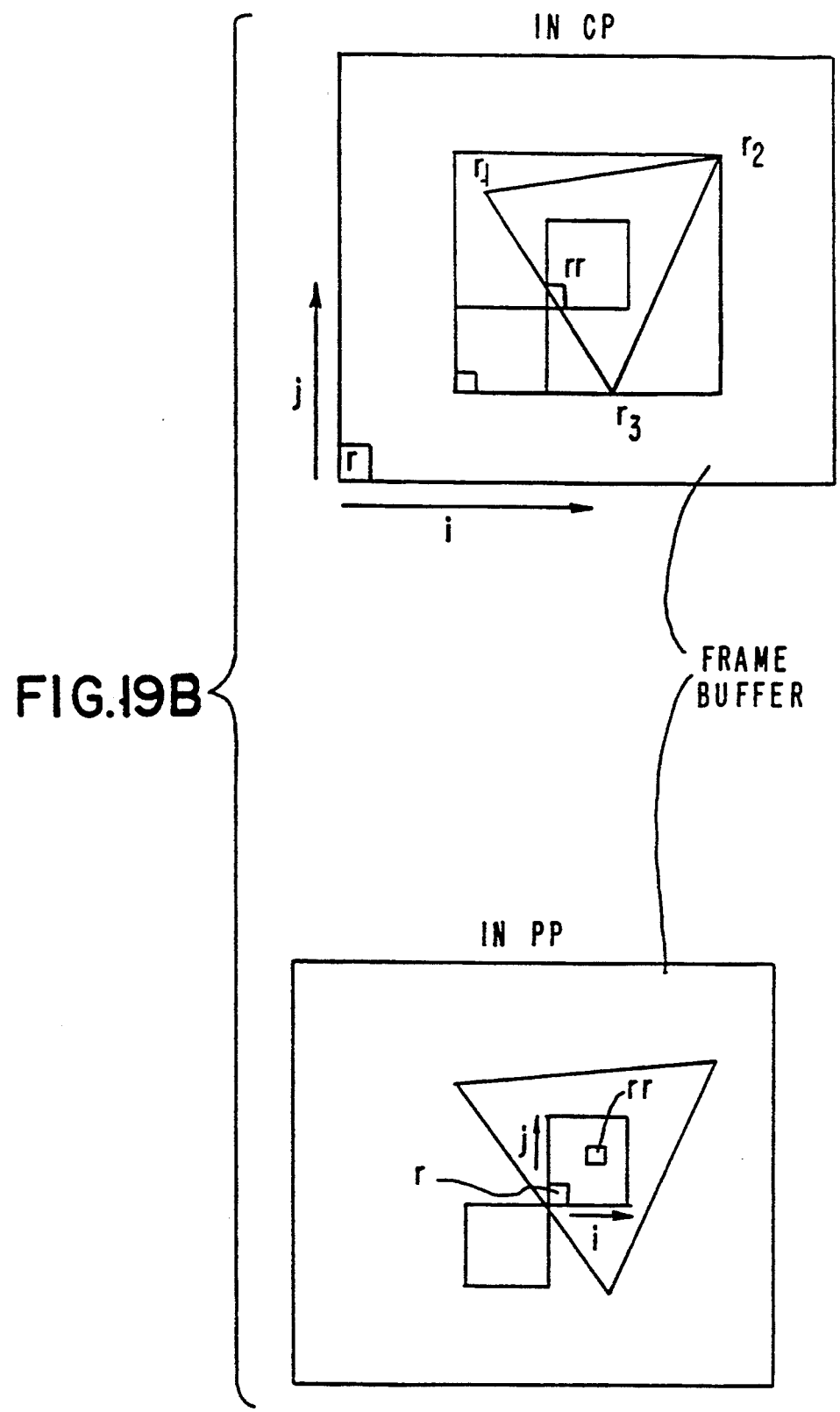

FIGS. 19A and 19B are the diagrammatic representations of the geometry and trigonometry involved in calculating the rate of change of distances to the three edges of the triangle and the rate of change of colors as a pixel is moved unit directions in the x and y directions as described previously with respect to FIG. 10. More particularly, FIG. 19A describes the computation with the distances dkx, dky and FIG. 19B describes the computation of the three rates of change of color intensity values e.g. rx, ry. In the top half of each figure, a diagrammatic representation of the coordinate processor's computation is shown and in the bottom half of each figure, the evaluation of the indices i,j which is done in each pixel processor is illustrated diagrammatically. Also a set of straight forward geometric formulas is set forth, by way of example, for each of these figures subsequently.

FIG. 19A illustrates the geometric constructions used to compute the requisite data in the coordinate processor and in the pixel processors. In the coordinate processor, the distance from the origin of a constituent block to an edge is calculated. In the pixel processor, the distance from a pixel to an edge is calculated. In both cases, the rate of change values need to be known. These are calculated by the coordinate processor and are shown as the values dxk and dyk (where k=1-3). In both cases, a distance from an origin needs to be known. The coordinate processor determines these. The coordinate processor uses the formula for dd1 to calculate the distance from the origin of a constituent block to edge 1 etc. A pixel processor uses the same formula to find the distance from its particular pixel to the edge utilizing the appropriate indices i,j. It should be noted that if a point is in a triangle, then all distances from the lines to the point will all be positive or negative depending on whether points are chosen in clockwise or counterclockwise direction. Therefore, if a point is moved from point 1 to point 2 and the first distance is negative, then reversing the direction and moving from point 1 to point 3 will produce a positive distance. Three positive distances will then indicate that a point is in the triangle. Therefore in a pixel processor if the dd1 is negative, then dd1, dd2 and dd3 are multiplied by a −1. This insures that for a point in a triangle all the distances are positive.

For purposes of the present embodiment the index variables i,j are two bits wide. It is assumed that there are no multipliers in the pixel processor; but the multiplications can be rapidly carried out by addition. This simplifies the hardware required for the pixel processors. Also in the embodiment i and j account for the "low order" effects on a distance or color calculation. The registers for calculating i*dx, for example, do not have to be wide. The d1 value contains the high order effect of the final value for dd1.

In the second embodiment of the invention, briefly described with respect to FIGS. 20 through 23, it is assumed that a pixel processor has a multiplier. In that case, i and j are significantly wider quantities since they will have to cover indices spanning the complete bounding box rather than just a four by four constituent block. As will be shown, d1 will be sent once for each triangle and a new i and j will be sent for each block. This second embodiment reduces the total amount of data sent from the coordinate processor to the individual pixel processors.

Calculated In Coordinate Processor $$\Delta x = x_2 - x_1$$
$$\Delta y = y_2 - y_1$$
$$L = ((\Delta x)^2 + (\Delta y)^2)^{\frac{1}{2}} = \text{length of line segment}$$

$$d1 = \frac{x_1 y_2 - y_1 x_2}{L} = \text{distance to an edge (1) from } x,y$$

$$dx = -\frac{\Delta y}{L} = \text{rate of change of distance per unit } x$$

$$dy = \frac{\Delta x}{L} = \text{rate of change of distances per unit } y$$

Calculated in Coordinate Processor (1) and Pixel Processor (2)

$$dd1 = d1 + i \cdot dx + j \cdot dy$$
$$= \text{distance indexed to an edge from:}$$

1) The origin of a constituent block in the coordinate processor, with $i, j$ indexed from the origin of the bounding box.

2) A particular pixel within the constituent block with $i, j$ indexed from the corner (origin) of the constitutent block.

FIG. 19B shows the formulas for calculating ultimately a shaded red value (rr) proceeding from the coordinate processor through the operations in a pixel processor. As in the distance calculations, the rate data and a red value r from an origin is required. Identical calculations would, of course, be performed for blue (b) and green (g).

It should be noted that the coordinate processor calculations described above could alternatively be performed in the host and transmitted to the coordinate processor and then to the pixel processors by the coordinate processor. They have been shown and described as being performed in the coordinate processor for clarity.

Calculated in Coordinate Processor $$D = (x_2 y_3 - y_2 x_3) + (y_1 x_3 - x_1 y_3) + (x_1 y_2 - y_2 x_2)$$

$$r = \frac{(x_2 y_3 - y_2 x_3) r_1 + (y_2 x_3 - x_1 y_3) r_2 + (x_1 y_2 - y_2 x_2) r_3}{D}$$

$$rx = \frac{(y_2 - y_3) r_1 + (y_3 - y_1) r_2 + (y_1 - y_2) r_3}{D}$$

$$ry = \frac{(x_3 - x_2) r_2 + (x_1 - x_3) r_2 + (x_2 - x_1) r_3}{D}$$

Calculated the Coordinate Processor (1) or in the Pixel Processor (2)

$$rr = r + rx.i + ry.y$$

where it is the value of red in (1) the corner of the constituent block and (2) at a particular pixel in the constituent block.

A second embodiment of the invention will now be briefly described since it is very similar to the prior embodiment with the exception of the fact that the contents of the triangle and block records are changed. In this embodiment, more data is placed in the triangle record sent once to the pixel processors and less data is placed in the constituent block record which must be recomputed and transmitted each time a new constituent block is processed.

Figure 20:
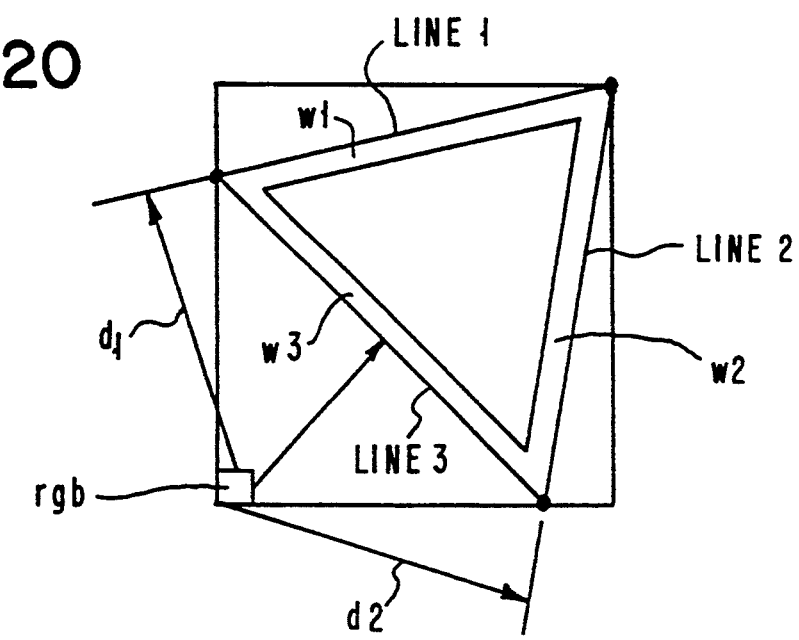
FIG. 20 comprises a data format and an illustrative diagram showing a single "triangle data record" sent from the coordinate processor to each pixel processor for a second embodiment of the invention.

FIG. 20 is a figure quite similar to FIG. 10 wherein the data contained in a triangle record is shown at the top of the figure and a diagrammatic representation of the geometrical meaning of these records is shown in the bottom portion. Added to the triangle record are the items of data shown in the bottom line of the data record. These are d1, d2, d3, r, g, b. These represent, respectively, the distances to the edges from the corner of the bounding box and the color intensity of the colors rgb at the corner or origin of said bounding box.

Figure 21:
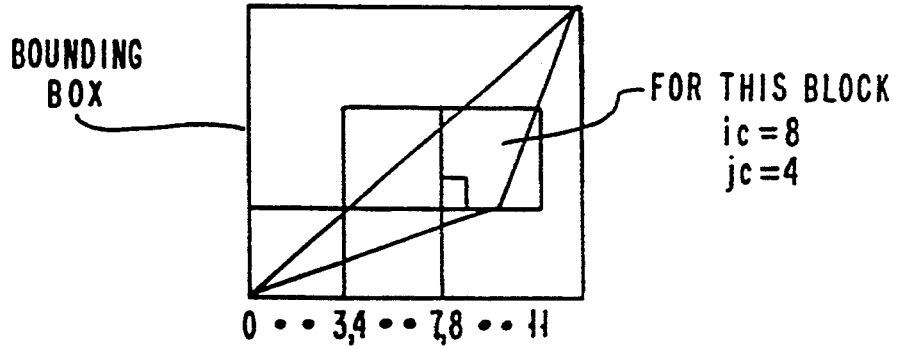
FIG. 21 comprises a data format and a related diagram illustrating the "block record" sent from the coordinate processor to each of the pixel processors when processing subsequent blocks within a bounding box for the second embodiment of the invention.

FIG. 21 shows the new constituent block record sent from the coordinate processor to the pixel processors each time a new constituent block is being processed. The indices i,c and j,c from the coordinate processor locate the origin of the particular constituent block being processed relative to the origin of the bounding box. In the pixel processors these will be added to i,p and j,p (p is for pixel) which are unique to the particular pixel within the constituent block being evaluated by the pixel processor. As will be understood, in the new pixel processor routine flow chart of FIG. 23, the pixel processor will be able to calculate the required distance d1, d2, d3 and color, rgb values utilizing x,y coordinate data calculated from these new indices.

It will be noted in FIG. 21 by way of example that a particular constituent block within a triangle is shown. As indicated in the legend next to the figure, ic=8 and jc=4 for the origin of this constituent block.

Figure 22:
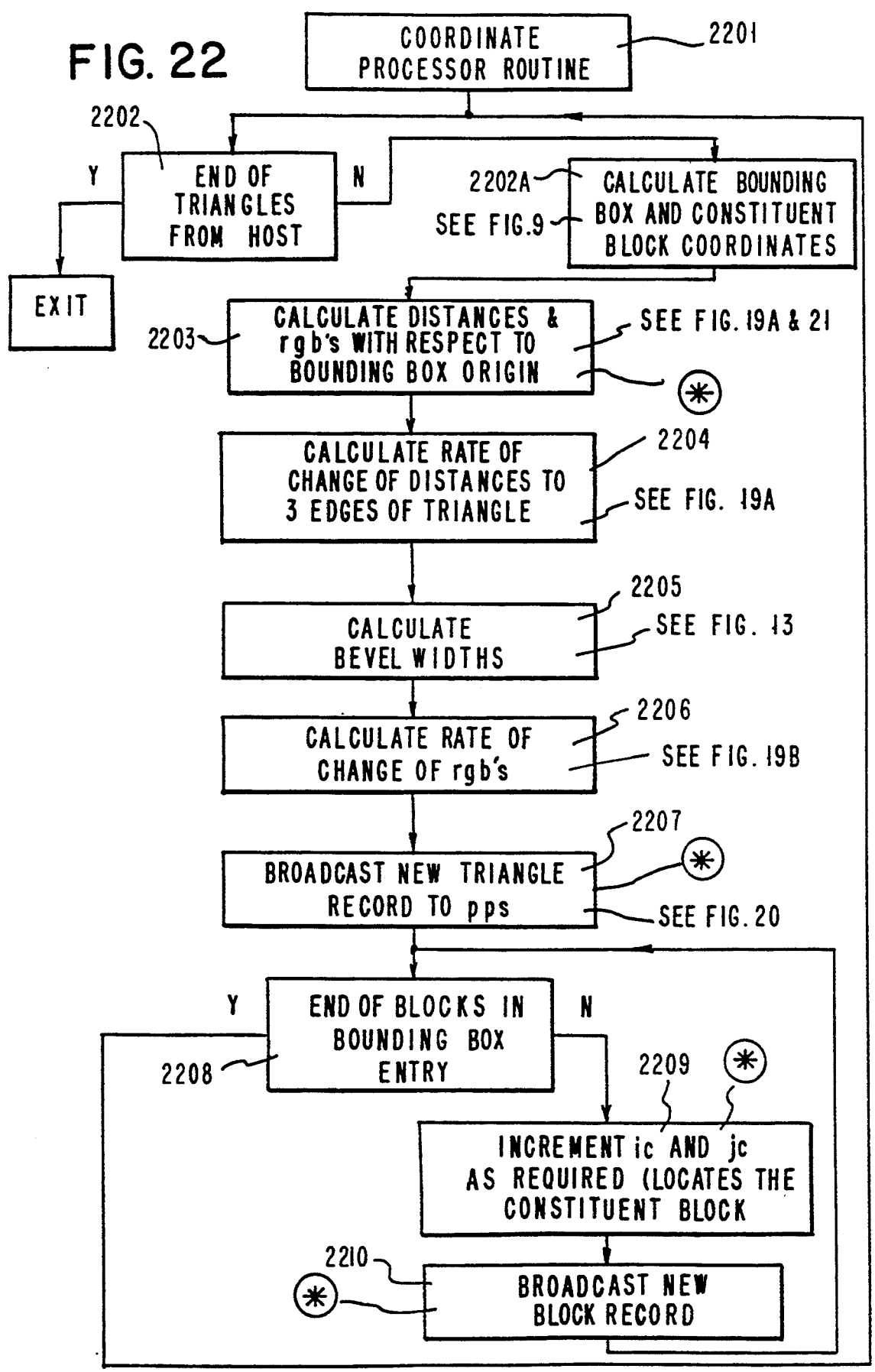
FIG. 22 comprises an overall flow chart similar to FIG. 12 of the operations which occur within the coordinate processor when practicing the method of the second embodiment of the invention.

FIG. 22 comprises a flow chart of the modified coordinate processor routine of the second embodiment. It differs from the flow chart of the first embodiment as set forth in FIG. 12 in those boxes marked by the symbol? as described previously for each triangle, the distance from the corner or origin of the bounding box is calculated once and also the color intensity value rgb of the corner or origin of the bounding box is similarly calculated by the coordinate processor. These values are sent to the pixel processors in the "new" triangle record.

This is indicated in block 2203 of FIG. 22. Blocks 2203 through 2208 of the remainder of the flow chart remain identical to those of FIG. 12 with the slight exception of block 2207; in this case, the additional information in the triangle record is sent to the pixel processors.

In block 2209 of the procedure, ic and jc which locate the constituent block in the bounding box are computed by the coordinate processor and sent to the pixel processors on each iteration of this inner loop. As will be seen, blocks 26 and 28 of FIG. 12, which calculated the distances and colors, have been eliminated from the coordinate processor routine. The new constituent block data containing the proper ic and jc are sent to the pixel processors in block 2210 and the system returns to block 2208 of the inner loop.

Figure 23:
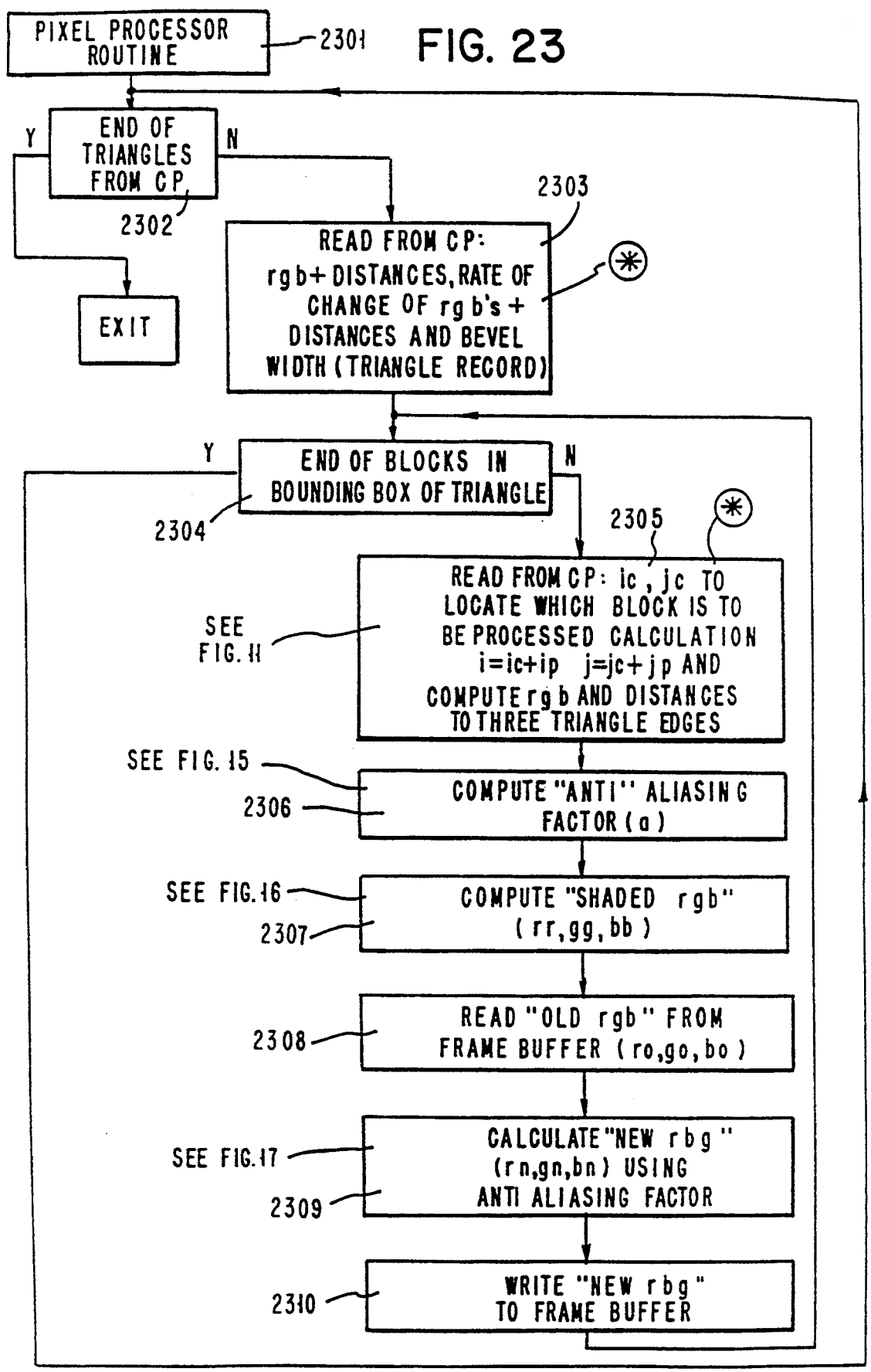
FIG. 23 comprises a flow chart similar to FIG. 14 of the operations which occur in each pixel processor in carrying out the method of the present invention in accordance with the second embodiment.

FIG. 23 illustrates the new pixel processor routine and is accordingly very similar to FIG. 14 described in detail previously. As stated with respect to FIG. 22, all of the blocks of FIG. 23 remain identical to those of FIG. 14 with the exceptions of those marked by a symbol ⊙. Thus in block 2303 of the procedure of 23 the modified triangle data is read from the coordinate processor including the rgb and d1, d2, d3 values for the triangle referenced to the origin of the bounding box.

The only other difference in the routine is included in block 2305 in the pixel processor routine wherein only the values ic and jc need to be read from the coordinate processor rather than the distances and colors for the origin of the specific constituent block. As was explained previously, these new indices will allow the proper evaluation of the values rgb and d1, d2 and d3 to be properly indexed for purposes of computing the anti-aliasing factor in block 2306. The same calculations are performed in block 2306 through 2310 as were performed in the previously described procedure of FIG. 14 with the exception that the values for dd1, dd2, dd3 are computed using d1, d2, d3 indexed now from the origin of the bounding box rather than from the origin of the individual constituent block. As will be appreciated, the result will be identical.

This completes the description of the present preferred embodiment of the invention with the modifications described relative to the flow charts of FIGS. 22 and 23. There are many other changes and modifications which could be made in the details of the procedure without departing from the spirit and scope of the present invention as set forth in the appended claims, namely of providing a completely parallel procedure which may be performed on all the processors of an SIMD architected pixel processor system which allows such an SIMD architecture to be used for the complicated procedures necessary in rendering smoothly shaded, anti-aliased, three-dimensional, color triangles onto a two-dimensional surface.

REFERENCES

[1] (Gou) Gourard H., "Continuous Shading of Curved Surfaces," IEEE Transactions of Computers, C-20 (6), pp. 623–628. June 1971.

[2] (Fly) Flynn, M. J., "Very High Speed Computing Systems," Proc. of the IEEE, 54:1901–9, 1966.

[3] (Fol) Foley, J. and A. Van Dam, "Fundamentals of Interactive Computer Graphics," Addison-Wesley, New York, 1982.

[4] (New) Newell, M. E., R. G. Newell and T. L. Sancha, "A Solution to the Hidden Surface Problem" Proc. ACM Nat. Conf., pp. 443, 1972.

[5] (Sch) Schacter, Bruce J. (editor), "Computer Image Generation," John Wiley and Sons, New York, 1983.

[6] (Tho) Thomas Jr., George B., "Calculus and Analytic Geometry," Addison-Wesley, Reading, Mass., 1966.

DESCRIPTION OF A PREFERRED PROGRAM EMBODIMENT

The following material comprises a program capable of executing the pixel processor operations in an SIMD environment. It is written in the Pascal programming language. The actual program statements are in the left-hand column and various descriptive "comments" relating to particular instructions or subsets of instructions are in the right-hand column as is conventional.

The program is intended to run in each processor of the $M \times N$ array of SIMD pixel processors to perform the shading and anti-aliasing functions for each of the associated $M \times N$ pixels in a particular constituent block of a bounding box as described previously. The program assumes that the coordinate processor communicates with each of the $M \times N$ pixel processors through a set of registers made up of three parts:

1) An op register to tell the pixel processors what type of data is in the data registers and what operations is to be performed.
2) x, y, z, and zz data registers which store all data read from the coordinate processor. zz is the index into an $M \times N$ array of pixels in the frame buffer, e.g., it is the origin address of the particular bounding block whose pixels are currently being processed (first embodiment). Each pixel consists of three color values (r, g, and b). There is a separate pixel storage array to which each pixel processor is connected. All of these latter arrays together make up the frame buffer.
3) Cpflag and ppflag are each one bit flags for handshaking between the coordinate and pixel processor. When the coordinate processor writes to the pixel processor, it sets cpflag and when it reads, it clears ppflag. Complimentary rules apply to the pixel processor. Handshaking is a conventional procedure in any communication system. The operation is both straightforward and well known and need not be described further.

The program 'tri' is a program for a pixel processor communicating with the coordinate processor via the registers described. For the purposes of this program, the coordinate and pixel processors are assumed to be conventional processors in terms of instructions performed, etc.. The subsequent description comprises the overall procedure and the main variables in the program 'tri'.

The following comprises a listing/definition of the program variables and main program on the left side with comments on the right side.

```
(*————————*)
Program tri;
(*————————*)
var
  op,x,y,z,zz,            (hardware registers and flags)
  cpflag,ppflag            "
  rx,gx,bx,               (incremental values passed initially)
  ry,gy,by,
  d1x,d2x,d3x,
  d1y,d2y,d3y,
  (the next 6 values are supplied each iteration)
```

-continued

```
d1,d2,d3,           (distances between a point and
                     the sides of the triangle)
r,g,b,              (red, green, and blue triangle
                     color values read
                     from coord processor)
i,j,                (known pixel processor indices)
opcode              (holds op from coord processor)
:integer;
fb:array(0 .. 2,0 .. max)
of integer;
(*--------------*)
begin               (of main program)
waitin;
                    (zz needs to be latched for
                     frame buffer accesses)
opcode:=op;
                    (cp=coordiante processor)
                    (pp=pixel processor)
case opcode of
(the following are done once per triangle)
1: readcp(rx,gx,bx);
2: readcp(ry,gy,by);
3: readcp(d1x,d2x,d3x);
4: readcp(d1y,d2y,d3y);
(the following are done each iteration)
5: begin readcp(d1,d2,d3);
6: begin readcp(r,g,);
compute; end;
otherwise;          (don't do anything)
end; (of main program)
(*--------------*)
The following is a listing of the main subroutines on the
left with comments on the right.
(*--------------*)
procedure compute;
(*--------------*)
var
dd1,dd2,dd3,        (temp variables)
w1,w2,w3,
a1,a2,a3,
rr,gg,bb,           "
a,                  (anti-alias value)
ro,go,bo,           (old fb color values)
rn,gn,bn            (new fb color values)
:integer;
(*--------------*)
begin
                    (calculate the anti-alias
                     value (a) for one
                     triangle)
dd1:= d1 + i*d1x + j*d1y;   (calculate a distance
dd2:= d2 + i*d2x + j*d2y;    for this pixel)
dd3:= d3 + i*d3x + j*d3y;
w1:= max (d1x,d1y);         (calculate the bevel width
w2:= max (d2x,d2y);          (wk) inside the tri.)
w3:= max (d3x,d3y);
a1:= determa (dd1,w1);      (determine anti-aliasing
a2:= determa (dd2,w2);       values)
a3:= determa*dd3,w3);
a:= min(a1,a2,a3);          (calculate the (a) for
                             the triangle)

(* calculate the new          (using the coord colors,
color values *)              calculate a smoothed
                             value. Will be used later
                             to calculate an
                             anti-aliased color
                             value.)
rr:= r + i*rx + j*ry;
gg:= g + i*gx + j*gy;
bb:= b + i*bx + j*by;

readfb (ro,go,bo);          (read from frame buffer)
rn:= a*rr + (1-a) *ro;      (calculated new colors
gn:= a*gg + (1-a) *go;       which are anti-aliased
                             by the (a) amount)
bn:= a*bb + (1-a) *bo;      (the two colors mixed are
                             from the frame buffer
                             and from the smoothed
                             pixel just calculated)
writefb (rn,gn,bn);         (write the frame buffer
                             with 1) averaged value,
                             2) the old value from the
                             frame buffer, or 3) the
                             value from coordinate
                             processor)
end;

The following is a list of the minor subroutines used in
the program on the left with comments on the right.
(*--------------*)
procedure waitin;           (pp waits for input from
(*--------------*)           the cp)
begin
repeat
until cpflag=1;
(*--------------*)
(*--------------*)
procedure readcp (a,b,c: integer); (reads from cp)
(*--------------*)
begin
a:=x; b:=y; c:=z;
cpflag:=0
end function determa (dk,wk: integer) :integer;

begin
if dk<-0                    (returns (a) as a value
then determa := 0            of 0,1 or a fraction)
else if dk<wk
then determa := dk div wk
also determa := 1;
end:
(*--------------*)
(*--------------*)
procedure writecp (a,b,c: integer); (pp writes to cp)
(*--------------*)
begin
ppflag:=1;
x:=a; y:=b; z:=c;
end;
(*--------------*)
(*--------------*)
procedure read±b (a,b,c: integer);
(*--------------*)
begin a:=fb (0,zz); b=fb (1,zz); c:=fb (2,zz)
end;
(*--------------*)
procedure writefb (a,b,c: integer);  (uses zz to
                                      write the
                                      frame
                                      buffer)
(*--------------*)
begin fb (0,zz) :=a; fb (1,zz) :=b; fb (2,zz) :=c
end;
(*--------------*)
```

Having thus described our invention, what we claim as new, and desire to secure by Letters Patent is:

1. A method for rendering an image in smoothly shaded, anti-aliased, three dimensional triangles into a frame buffer using a plurality of pixel processors organized in a SIMD architecture said method being performed in a video display system including a host processor, a coordinate processor, wherein said frame buffer stores video data for display on a display monitor, said method comprising a parallel procedure operable simultaneously in all of said pixel processors wherein there are M×N processors where M and N are greater than one, rendering M×N contiguous pixels of video data into said frame buffer comprising the steps of:

1) accessing from the coordinate processor data about a triangle being rendered including rate of change of distances in both an x and y direction relative to three sides of the triangle across the display, rate of change of color intensity values across the display and bevel widths for the three sides of the triangle which define regions in which anti-aliasing is to be performed, 2) determining if all constituent blocks in a bounding box have been evaluated and, if not,
3) accessing from the coordinate processor computed distance values to each of three sides of the triangle from an origin of said M×N array and color intensity values at the origin of said M×N array,
4) indexing said distance and color data accessed in Step (3), for a particular pixel in said M×N array being processed by a particular processor,
5) computing anti-aliasing factor (a) for a particular pixel being rendered,
6) computing shaded color values (rr,gg,bb) for said particular pixel being shaded using data indexed in step (4),
7) accessing current color values (ro,go,bo) of said particular pixel from the frame buffer,
8) calculating new color values, (rn,gn,bn) for said particular pixel being rendered using the computed anti-aliasing factor (a), the shaded color values (rr,gg,bb) and the current color values (ro,go,bo),
9) storing these new color values (rn,gn,bn) in the frame buffer for access by the display monitor,
10) returning to step (2),
11) if it is determined that all constituent blocks in a bounding block have been evaluated returning to step (1).

2. An improved method for rendering shaded anti-aliased three-dimensional color triangles into a frame buffer as set forth in claim 1 wherein the step of computing the anti-aliasing factor (a) comprises, the steps of:

1) determining a distance (ddk) of a pixel from each of three edges of the triangle,
2) determining an anti-aliasing factor (ak) relative to each edge of the triangle wherein (ak)=0 if a pixel is totally outside of the triangle,
   (ak)=1 if a pixel is totally within the triangle, and $$(ak) = \frac{ddk}{wk}$$

if the pixel lies within a bevel with a width wk for any edge and
3) selecting as the anti-aliasing value (a) for a particular pixel, the minimum value of (ak) calculated in step 2).

3. An improved method for rendering shaded anti-aliased three-dimensional color triangles into a frame buffer as set forth in claim 1 wherein the step of calculating the new color values (rn, bn, gn) for a pixel comprises calculating for each color (r, g, b) the following functions:

rn=a*rr+(1-a)*ro
gn=a*gg+(1-a)*go
bn=a*bb+(1-a)*bo
wherein: * implies multiplication
rr, gg, bb are the calculated shaded values, ro, go, bo are old color values stored in the frame buffer.

4. An improved method for rendering shaded anti-aliased three- dimensional color triangles into a frame buffer as set forth in claim 1 wherein the step of computing the shaded color values (rr, gg, bb) for a particular pixel comprises calculating for each color the following functions:

rr=r+i*rx+j*ry
gg=g+i*gx+j*gy
bb=b+i*bx+j*by
wherein: * implies multiplication
rx, ry, gx, gy, bx, by are rate of change of color, i and j are indices for the pixel relative to the origin of the constituent block, r, g, b, are computed intensity values from the coordinate processor at the origin of a constituent block.

5. A method for rendering smoothly shaded, anti-aliased, three dimensional triangles into a frame buffer using a plurality processors organized in a SIMD architecture said method being performed in a video display system including a host processor, a coordinate processor, wherein said frame buffer stores video data for display on a display monitor, said method comprising a parallel procedure operable simultaneously in all of said pixel processors wherein there is an M×N array of such processors where M and N are greater than one, thereby rendering M×N contiguous pixels of video data into said frame buffer comprising the steps of:

1) accessing from the coordinate processor data about a triangle being rendered including rate of change of distances in both an x and a y direction relative to three sides of the triangle across the display, rate of change of color intensity values across the display, bevel widths for the three sides of the triangle which define regions in which anti-aliasing is to be performed, distances in both the x and y directions to each of the three sides of the triangle from a bounding box origin and color intensity values at the bounding box origin,
2) determining if all constituent blocks in a bounding box have been evaluated and if not,
3) accessing from the coordinate processor index values locating an origin for a constituent block that has not been evaluated,
4) indexing distance and color data from data accessed in steps (1) and (3) for a particular pixel in said M×N array being processed by a particular processor,
5) computing anti-aliasing factor (a) for said particular pixel being rendered,
6) computing shaded color values (rr,gg,bb) for said particular pixel being shaded from data indexed in step 4,
7) accessing current color values (ro,go,bo) of said particular pixel from the frame buffer,
8) calculating new color values, (rn,gn,bn) for said particular pixel being rendered using the computed anti-aliasing factor (a), the shaded color values (rr,gg,bb) and the current color values (ro,go,bo),
9) storing these new color values (rn,gn,bn) in the frame buffer for access by the display monitor,
10) returning to step (2),
11) if it is determined that all of the constituent blocks in a bounding box have been evaluated, returning to step (1).

6. An improved method for rendering shaded anti-aliased three-dimensional color triangles into a frame buffer as set forth in claim 5 wherein the step of computing the anti-aliasing factor (a) comprises the steps of:

1) determining a distance (ddk) of a pixel from each of three edges of the triangle,
2. determining an anti-aliasing factor (ak) relative to each edge of the triangle wherein (ak)=0 if a pixel is totally outside of the triangle, (ak)=1 if a pixel is totally within the triangle, and $$(ak) = \frac{ddk}{wk}$$

if the pixel lies within a bevel with a width wk for any edge and 3) selecting as the anti-aliasing value (a) for a particular pixel, the minimum value of (ak) calculated in step 2.

7. An improved method for rendering shaded anti-aliased three-dimensional color triangles into a frame buffer as set forth in claim 5 wherein the step of calculating the new color values (rn, bn, gn) for a pixel comprises calculating for each color (r, g, b) the following functions:

rn=a*rr+(1-a)*ro
gn=a*gg+(1-a)*go
bn=a*bb+(1-a)*bo wherein: * implies multiplication rr, gg, bb are the calculated shaded values, ro, go, bo are old color values stored in the frame buffer.

8. An improved method for rendering shaded anti-aliased three-dimensional color triangles into a frame buffer as set forth in claim 5 wherein the step of computing the shaded color values (rr,gg,bb) for a particular pixel comprises calculating for each color the following functions:

rr=r+i*rx+j*ry
gg=g+i*gx+j*gy
bb=b+i*bx+j*by wherein: * implies multiplication rx,ry,gx,gy,bx,by are rate of change of color, i and j are indices for the pixel relative to the origin of the constituent block, r,g,b are computed intensity values from the coordinate process- or at the origin of a constituent block.

9. A method for rendering smoothly shaded, anti-aliased, three dimensional triangles into a frame buffer using a plurality of processors organized in a SIMD architecture said method being performed in a video display system including a host processor, a coordinate processor, wherein said frame buffer stores video data for display on a display monitor, said method comprising a parallel procedure operable simultaneously in all of said pixel processors wherein there are M×N processors, where M & N are greater than one, rendering M×N contiguous pixels of video data into said frame buffer comprising the steps of:

1) accessing from the host processor three-dimensional coordinates and color intensity values for three vertices of a color triangle to be rendered,
2) determining coordinates of a bounding box which completely encloses a particular triangle to be rendered, composed of M×N pixel constituent blocks, arranged in columns (c) and rows (r)
3) determining an origin for a first constituent block, in said bounding,
4) calculating distances along a perpendicular to each of three sides of the triangle with respect said origin,
5) calculating color intensity values at said origin,
6) calculating rate of change of distance to three edges of the triangle along both the x and y axes,
7) determining a bevel width for each of the three sides of the triangle,
8) calculating the rate of change of colors along both the x and y axes,
9) broadcasting the data computed in Steps (4), (5), (6), (7) and (8) to all of the pixel processors,
10) determining if all constituent blocks in a bounding box surrounding said triangle have been evaluated and if not
11) calculating indices ic and jc which locate an origin of an unevaluated constituent block relative to the origin of the first constituent block,
12) broadcasting information calculated in Step (11) to the pixel processors,
13) again determining if all constituent blocks in a bounding box surrounding the triangle have been evaluated and if so,
14) determining if all triangles forming a complete display have been evaluated and if so exiting from the procedure, and if not returning to Step (1).

* * * * *